US008150132B2

(12) United States Patent
Nakamura

(10) Patent No.: US 8,150,132 B2
(45) Date of Patent: Apr. 3, 2012

(54) IMAGE ANALYSIS APPARATUS, IMAGE ANALYSIS METHOD, AND COMPUTER-READABLE RECORDING MEDIUM STORING IMAGE ANALYSIS PROGRAM

(75) Inventor: Keigo Nakamura, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 522 days.

(21) Appl. No.: 12/405,812

(22) Filed: Mar. 17, 2009

(65) Prior Publication Data

US 2009/0232378 A1    Sep. 17, 2009

(30) Foreign Application Priority Data

Mar. 17, 2008  (JP) ................................. 2008-067072

(51) Int. Cl.
*G06K 9/00*    (2006.01)
(52) U.S. Cl. ...................................................... 382/131
(58) Field of Classification Search .................... 382/131
See application file for complete search history.

(56) References Cited

U.S. PATENT DOCUMENTS

| 7,245,747 | B2 | 7/2007 | Oosawa | |
| 2004/0101191 | A1* | 5/2004 | Seul et al. | 382/151 |
| 2006/0222226 | A1* | 10/2006 | Xia et al. | 382/128 |
| 2007/0121778 | A1 | 5/2007 | Shen et al. | |
| 2007/0269089 | A1 | 11/2007 | Sakaida | |
| 2010/0074475 | A1* | 3/2010 | Chouno | 382/107 |

FOREIGN PATENT DOCUMENTS

| JP | 6-189934 A | 7/1994 |
| JP | 8-294485 A | 11/1996 |
| JP | 9-187444 A | 7/1997 |
| JP | 2002-109548 A | 4/2002 |
| JP | 2002-253539 A | 9/2002 |
| JP | 2005-108195 A | 4/2005 |
| JP | 2007-307205 A | 11/2007 |
| JP | 2008-6188 A | 1/2008 |

\* cited by examiner

*Primary Examiner* — Rodney Fuller
(74) *Attorney, Agent, or Firm* — Birch, Stewart, Kolasch & Birch, LLP

(57) ABSTRACT

Positional relationships are automatically determined with higher accuracy in a predetermined direction between three-dimensional images representing a subject including a periodic structure having periodicity in the predetermined direction, with respect to the periodic structure. A positional correspondence is provisionally determined in a predetermined direction between two three-dimensional images including a periodic structure having periodicity in the predetermined direction, based on a criterion wherein the periodic structure contributes less to the determination. The provisionally determined correspondence is then corrected so that a position in one of the three-dimensional images corresponding to a position of the other three-dimensional image in the predetermined direction can be corrected within a range near the position in the former three-dimensional image in the predetermined direction, according to a criterion wherein the periodic structure contributes more.

8 Claims, 15 Drawing Sheets

FIG.11A

|  | SLICE 1 | SLICE 2 | SLICE 3 | SLICE 4 | SLICE 5 | SLICE 6 | ... |
|---|---|---|---|---|---|---|---|
| HEAD | -0.3 | -0.2 | -0.5 | -0.7 | -0.9 | -0.7 |  |
| HEAD-NECK | 2.0 | 1.2 | 0.1 | -0.5 | -0.8 | -0.5 |  |
| NECK | -0.3 | -0.1 | 1.2 | 0.6 | 1.1 | 0.5 |  |
| CHEST | -0.5 | -0.3 | -0.1 | 0.7 | 0.6 | 1.3 |  |
| ........ |  |  |  |  |  |  |  |

FIG.11B

|  | SLICE 1 | SLICE 2 | SLICE 3 | SLICE 4 | SLICE 5 | SLICE 6 | ... |
|---|---|---|---|---|---|---|---|
| HEAD | 2.3 | 1.4 | 1.7 | 2.1 | 2.0 | 2.0 |  |
| HEAD-NECK | 0 | 0 | 1.1 | 1.9 | 1.9 | 1.8 |  |
| NECK | 2.3 | 1.3 | 0 | 0.1 | 0 | 0.8 |  |
| CHEST | 2.5 | 1.5 | 1.3 | 0 | 0.5 | 0 |  |
| ........ |  |  |  |  |  |  |  |

FIG.11C

|  | SLICE 1 | SLICE 2 | SLICE 3 | SLICE 4 | SLICE 5 | SLICE 6 | ... |
|---|---|---|---|---|---|---|---|
| HEAD | 2.3 | 1.4 | 1.7 | 2.1 | 2 | 2 |  |
| HEAD-NECK | 0 | 0 | 0 | 1.1 | 1.9 | 1.9 |  |
| NECK | 0 | 1.3 | 0 | 0.1 | 1.1 | 2.7 |  |
| CHEST | 2.3 | 1.5 | 2.3 | 0 | 0.6 | 1.1 |  |
| ........ |  |  |  |  |  |  |  |

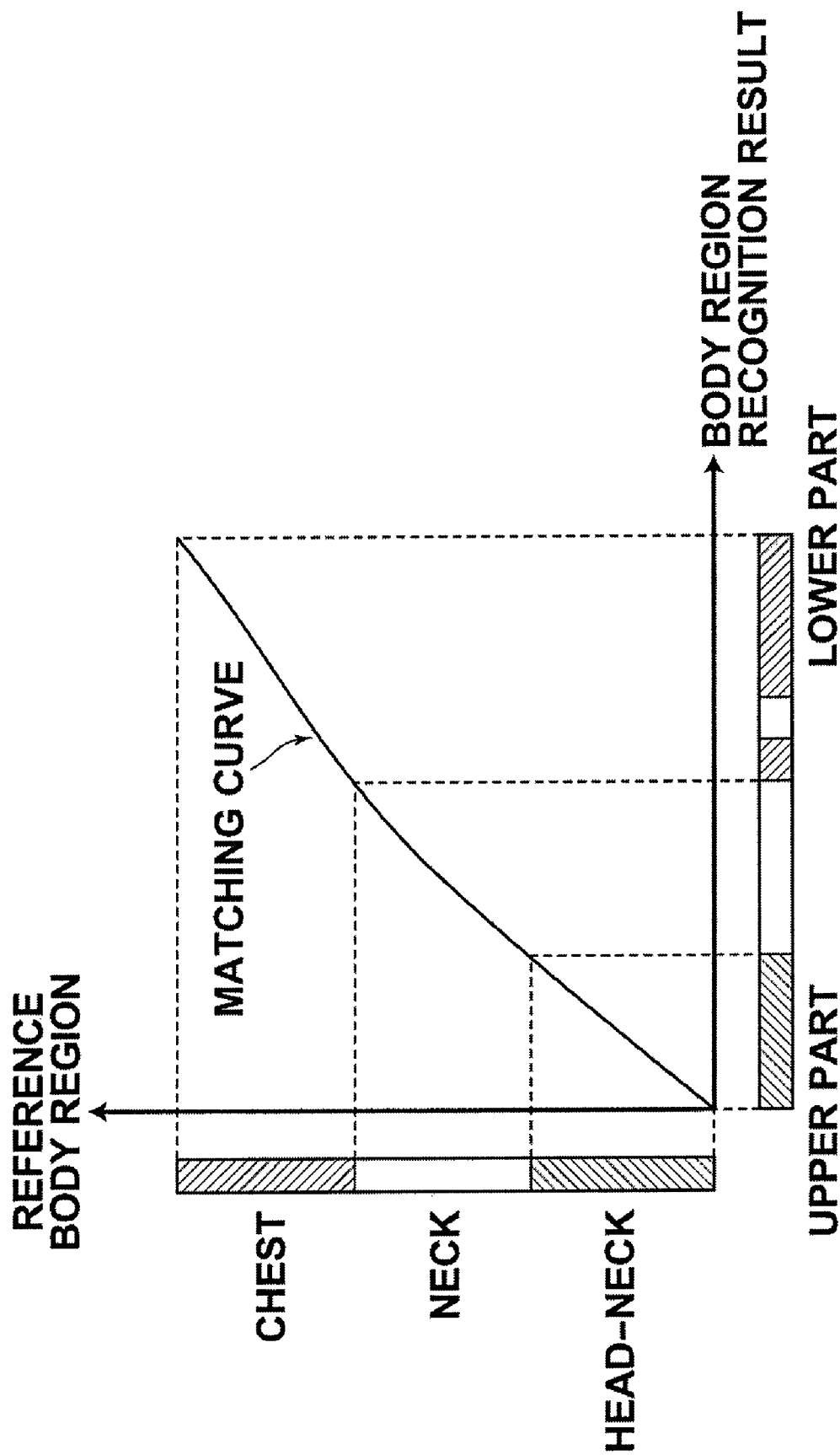

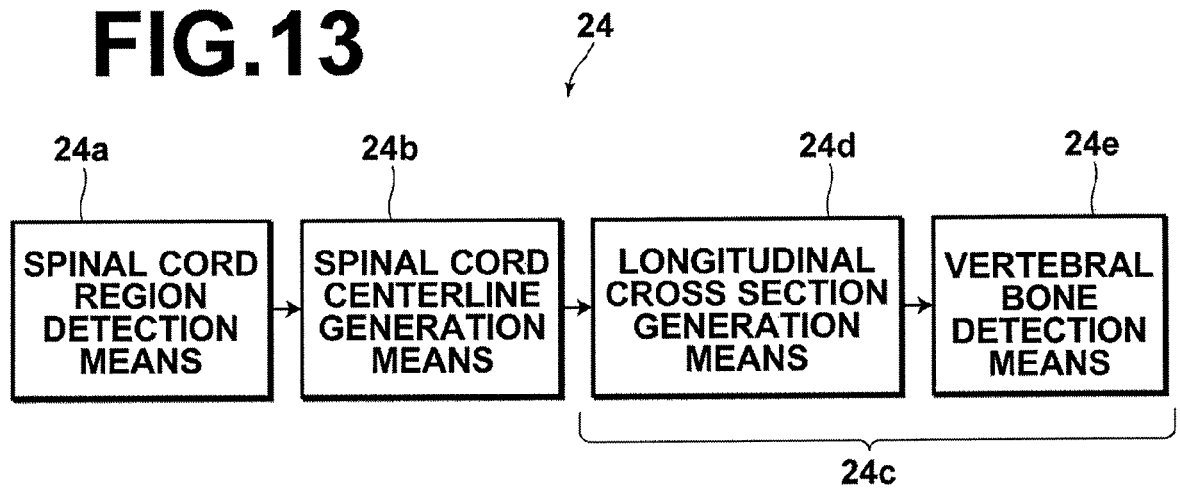
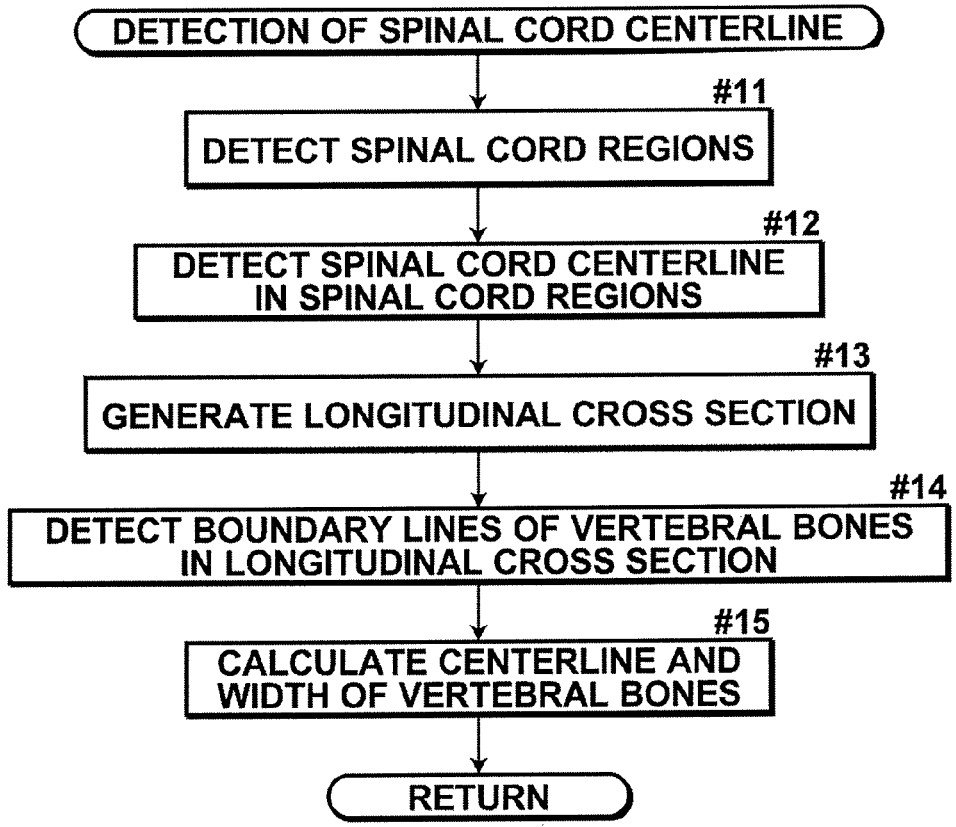

FIG.20
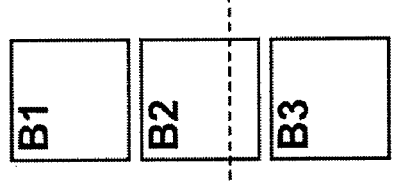
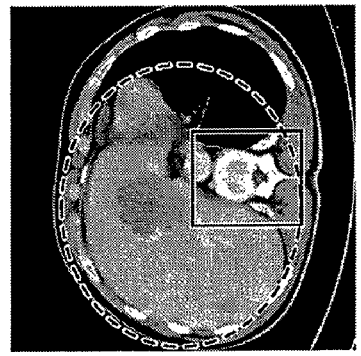
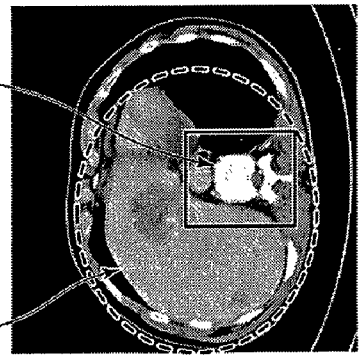
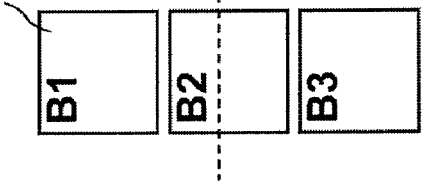

FIG.21
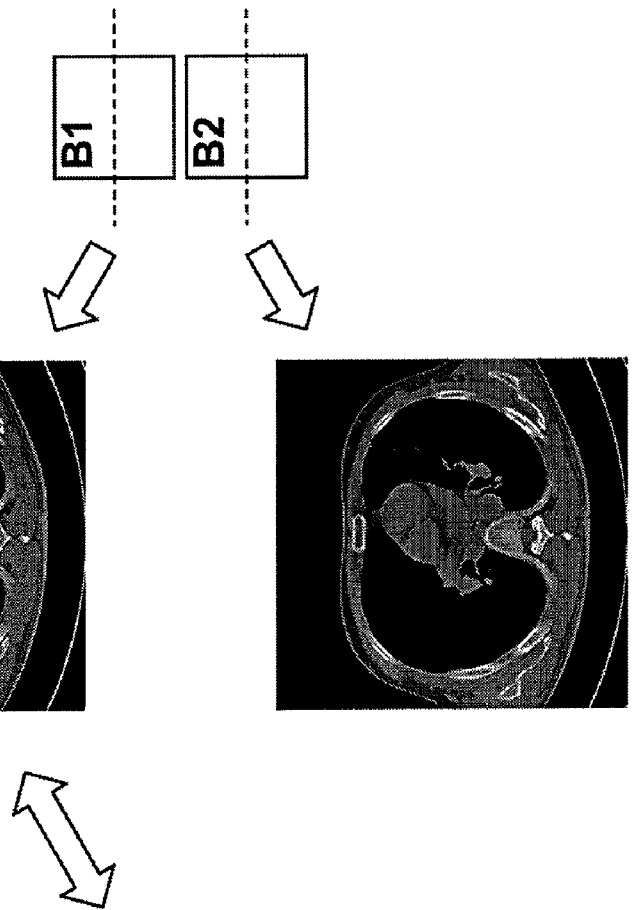
<THREE-DIMENSIONAL IMAGE $V_2$>
<THREE-DIMENSIONAL IMAGE $V_1$>
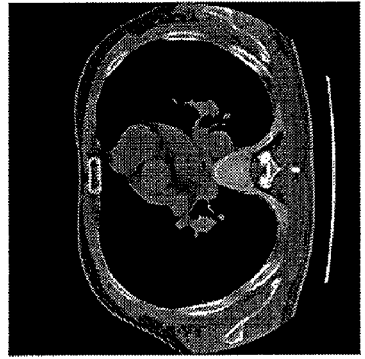
VERTEBRAL BONE

US 8,150,132 B2

IMAGE ANALYSIS APPARATUS, IMAGE ANALYSIS METHOD, AND COMPUTER-READABLE RECORDING MEDIUM STORING IMAGE ANALYSIS PROGRAM

BACKGROUND OF THE INVENTION

Field of the Invention

The present invention relates to image analysis that determines a positional relationship in a predetermined direction between two three-dimensional images.

Description of the Related Art

In comparison and interpretation of a plurality of three-dimensional images each comprising a plurality of tomographic images as slices obtained perpendicularly to a body axis direction, a technique for displaying corresponding ones of the tomographic images in parallel has been known (Japanese Unexamined Patent Publication No. 8(1996)-294485, for example). In this technique, correspondences between the tomographic images are determined based on a pair of corresponding slice positions specified by an operator and on slice thickness of the respective three-dimensional images, for example. Based on the correspondences, the corresponding tomographic images are displayed in parallel. As a method for automatically determining the pair of corresponding slice positions proposed in Japanese Unexamined Patent Publication No. 8(1996)-294485, a correlation operation is carried out between the three-dimensional images to be compared and interpreted, and the corresponding positions are determined by finding an amount of shift between the images in the predetermined structural axis direction at the time the correlation becomes highest. Target regions on which the correlation operation is carried out (hereinafter referred to as ROIs) are selected by the operator or automatically selected through frequency analysis or the like.

In the case where axial images constituting a plurality of three-dimensional images representing a human body are compared and interpreted, physicians carrying out actual image interpretation wish to display corresponding ones of axial images in parallel by determining correspondences between the axial images with respect to vertebral bones that are not easily affected by respiration or the like.

However, at the time of finding correspondences in a body axis direction by a correlation operation between three-dimensional images as targets of comparison and interpretation, if regions targeted by the correlation operation include a structure such as organs or the like other than vertebral bones, the texture of the vertebral bones or the like having periodicity in the body axis direction contributes less to the correlation between the three-dimensional images due to the periodicity. Therefore, the correspondences are actually determined with respect to a structure other than the vertebral bones, and axial images having a wrong positional relationship between the vertebral bones may be displayed in some cases. FIG. 20 schematically shows an example of such a case. For example, in the case where a tomographic image having a high correspondence with a tomographic image cut by a cross-sectional plane near the center of a vertebral bone B2 in a three-dimensional image $V_1$ is identified in a three-dimensional image $V_2$ while attention is paid to a whole of each of the tomographic images, the texture of liver changes greatly depending on a position of a cross-sectional plane of each of the tomographic images along a body axis direction obtained from the three-dimensional image $V_2$. However, the texture of the vertebral bones does not change so much as the liver. Therefore, a tomographic image having high similarity in the texture of the liver is identified in the three-dimensional image $V_2$. In reality, since a positional relationship between the liver and the vertebral bones can change in tomographic images of chest and abdomen of a subject due to respiration or the like, the position of the cross-sectional plane of the tomographic image identified in the three-dimensional image $V_2$ does not necessarily represent a position near the center of the vertebral bone B2 in the three-dimensional image $V_1$.

On the other hand, in the case where a target of correlation operation is limited to regions of vertebral bones alone, different vertebral bones may be related to each other due to the periodicity of the texture of the vertebral bones. Consequently, axial images wherein vertebral bones are not aligned to each other are displayed in parallel in some cases. FIG. 21 schematically shows an example of such a case. In the case where a tomographic image having similar vertebral bone texture to a tomographic image cut by a cross-sectional plane near the center of a vertebral bone B2 in a three-dimensional image $V_1$ is identified in a three-dimensional image $V_2$, not only an image near the center of the bone B2 but also a tomographic image cut by a cross-sectional plane near the center of a vertebral bone B1 in the three-dimensional image $V_2$ are similar to the tomographic image cut by the cross-sectional plane near the center of the vertebral bone B2 in the three-dimensional image $V_1$, due to the periodicity of the vertebral bone texture. Therefore, the correlation of the tomographic image cut by the cross-sectional plane near the center of the vertebral bone B2 in the three-dimensional image $V_1$ with the tomographic image cut by the cross-sectional plane near the center of the vertebral bone B1 in the three-dimensional image $V_2$ becomes higher than the correlation with the tomographic image cut by the cross-sectional plane near the center of the vertebral bone B2 in the three-dimensional image $V_2$, due to an effect by a difference in imaging conditions or the like between the two three-dimensional images. As a result, the vertebral bone B2 in the three-dimensional image $V_1$ can be related to the vertebral bone B1 in the three-dimensional image $V_2$.

SUMMARY OF THE INVENTION

The present invention has been conceived based on consideration of the above circumstances, and an object of the present invention is to provide an image analysis apparatus, an image analysis method, and a computer-readable recording medium storing an image analysis program that enable higher-accuracy automatic determination of a positional relationship in a predetermined direction between three-dimensional images representing a subject including a structure having periodicity in the predetermined direction, by using the structure having the periodicity as a reference.

An image analysis apparatus of the present invention comprises:

correspondence determination means for determining a positional correspondence in a predetermined direction between two three-dimensional images representing a subject including a structure having periodicity in the predetermined direction, based on a criterion in which the structure having the periodicity contributes less; and correspondence correction means for correcting the correspondence determined by the correspondence determination means, based on a criterion in which the periodic structure contributes more. The correspondence correction means corrects the correspondence by correcting a position in one of the three-dimensional images related by the determined correspondence in the predetermined direction to a position in the other three-dimensional image in the predetermined direction, within a range near the position in the former three-dimensional image in the predetermined direction.

An image analysis method of the present invention comprises the steps of:

determining a positional correspondence in a predetermined direction between two three-dimensional images representing a subject including a structure having periodicity in the predetermined direction, based on a criterion in which the structure having the periodicity contributes less; and correcting the determined correspondence, based on a criterion in which the periodic structure contributes more. In the step of correcting the determined correspondence, the correspondence is corrected by correcting a position in one of the three-dimensional images related by the determined correspondence in the predetermined direction to a position in the other three-dimensional image in the predetermined direction, within a range near the position in the former three-dimensional image in the predetermined direction.

A computer-readable recording medium storing an image analysis program of the present invention stores a program that causes a computer to execute the image analysis method described above.

Hereinafter, the present invention will be described in detail.

The present invention is more effective if the subject includes not only the structure having the periodicity in the predetermined direction but also a structure whose positional relationship to the periodic structure is changeable in the predetermined direction.

As an example of the structure having the periodicity in the predetermined direction, a spinal column having periodicity of vertebral bones in a body axis direction of a human body may be listed. In this case, an organ such as lungs that can change a position thereof by respiration or the like may be listed as an example of the structure whose positional relationship to the spinal column (the vertebral bones) can change in the body axis direction.

It is preferable for the subject to be of the same type. However, the subject may represent the same individual or different individuals.

The two three-dimensional images may have been obtained by imaging with the same modality or by different modalities. The two three-dimensional images may also have been obtained in different series of the same examination or in two examinations on different dates. In addition, the two three-dimensional images may be two three-dimensional images representing a three-dimensional dynamic state of the subject, that is, three-dimensional images representing a change in a three-dimensional state of the subject at two times in a four-dimensional image obtained in the same examination.

Data sets of the three-dimensional images may comprise data sets of tomographic images at a plurality of points along a structural axis in the predetermined direction, or data sets of tomographic images at a plurality of points along a structural axis in a direction different from the predetermined direction. In addition, the data sets may be data sets such as voxel data sets based on a three-dimensional coordinate system. In this case, the predetermined direction does not necessarily agree with any one of axes of the coordinate system of the three-dimensional image data sets.

The positional correspondence between the two three-dimensional images in the predetermined direction relates a position of a point of the subject represented by one of the three-dimensional images in the predetermined direction to a position of a point of the subject in the other three-dimensional image in the predetermined direction. The correspondence varies, depending on a criterion of correspondence, due to an effect caused by difference in posture, imaged range, or state (such as a respiration phase) of the subject, for example.

The criterion in which the periodic structure contributes less refers to a criterion in which the presence of the periodic structure in the three-dimensional images does not greatly affect determination of the correspondence. The criterion may be a criterion wherein the presence of the periodic structure does not affect the determination at all (that is, a criterion in which the periodic structure does not contribute at all). More specifically, the criterion may use feature values obtained from images of a whole of the subject including the periodic structure, or feature values obtained from images representing a region other than the periodic structure in the subject. The feature values may be a set of values of pixels constituting the images. In the case where it has been known that an imaged range of the subject in the predetermined direction is substantially the same between the two three-dimensional images, if the data sets of the three-dimensional images comprise sets of data of tomographic images at a plurality of points on a structural axis in the predetermined direction, the criterion may use a slice number that identifies each of the tomographic images or a slice interval of the images. In the case where the data sets of the three-dimensional images are data sets in a three-dimensional coordinate system, the criterion may use coordinate values representing a position in the predetermined direction.

As a method of determining the correspondence, if information itself of the images is used as the criterion, the correspondence can be determined by finding an amount of shift of images in the predetermined direction when the correlation is found to be highest between the three-dimensional images through a correlation operation as has been described in Japanese Unexamined Patent Publication No. 8(1996)-294485. Alternatively, body regions in the subject represented by tomographic images cut by cross-sectional planes at a plurality of positions in the predetermined direction may be recognized in each of the three-dimensional images by using at least one feature value representing a characteristic of a region including a portion other than the periodic structure in the tomographic images. The correspondence is then determined in this case so as to cause a matching degree between the body regions recognized in the two three-dimensional images to become high enough to satisfy a predetermined criterion (see Japanese Unexamined Patent Publication No. 2008-006188, for example). In the case where the slice number is used as the criterion, the correspondence can be determined by relating tomographic images whose slice numbers agree with each other between the two three-dimensional images. In the case where the slice intervals are different between the two three-dimensional images, tomographic images whose relative positions in the predetermined direction agree with each other are identified based on the slice numbers and the slice intervals so that the correspondence can be determined by relating the tomographic images having been identified. In the case where the coordinate values of a position in the predetermined direction are used as the criterion, the correspondence can be determined by relating positions at which the coordinate values agree with each other.

The criterion in which the periodic structure contributes more refers to a criterion in which the presence of the periodic structure in the three-dimensional images greatly affects the correction of the correspondence. More specifically, the criterion may be a criterion using feature values obtained from a region in an image including the periodic structure alone or from a region wherein the periodic structure occupies a large portion. The feature values may be a set of pixel values in the region.

As an example of the range near the position, a range smaller than one periodic length of the structure can be listed.

As a specific method of correcting the correspondence, the following method can be listed. In this method, the periodic structure is detected in a tomographic image cut by a cross-sectional plane that is perpendicular to the predetermined direction at a given point in one of the three-dimensional images. A region of interest including the detected periodic structure is then set in the tomographic image. The periodic structure is detected in each of tomographic images cut by cross-sectional planes that are perpendicular to the predetermined direction at a plurality of candidate points within the range mentioned above from a point in the other three-dimensional image that corresponds to the given point and has been related by the correspondence determined by the correspondence determination means. Candidate regions corresponding to the region of interest and including the detected periodic structure are respectively set in the tomographic images at the plurality of candidate points. A position of the cross-sectional plane of the tomographic image including the candidate region whose similarity with the region of interest is highest out of the candidate regions at the candidate points is identified in the predetermined direction, and the correspondence is corrected so as to relate the identified position to the given point in the former three-dimensional image. For calculation of the similarity, in the case where the two three-dimensional images have been obtained by the same modality, the correlation of pixel values between the region of interest and each of the candidate regions can be used. In the case where the two three-dimensional images have been obtained by different modalities, mutual information between the region of interest and each of the candidate regions can be used.

A correspondence of positions between three or more three-dimensional images may also be found by using the image analysis apparatus, the image analysis method, and the image analysis program of the present invention.

According to the present invention, the positional correspondence in the predetermined direction between the two three-dimensional images representing the subject including the structure having periodicity in the predetermined direction is provisionally determined based on the criterion wherein the periodic structure contributes less. Thereafter, the provisionally determined correspondence is corrected based on the criterion wherein the periodic structure contributes more so as to correct the position in the predetermined direction in one of the three-dimensional images that corresponds to the position in the predetermined direction in the other three-dimensional image, within the range near the position in the former three-dimensional image in the predetermined direction. Therefore, the correspondence of the positions determined finally relates positions representing the same position of the periodic structure in the subject in the predetermined direction between the three-dimensional images, which has been desired by physicians actually carrying out image interpretation. In other words, the correspondence is determined mainly with respect to the periodic structure.

The provisional correspondence is determined mainly with respect to a structure other than the periodic structure before final determination of the correspondence mainly with respect to the periodic structure, and the provisional correspondence is corrected to the correspondence based mainly on the periodic structure within the range of minute adjustment to the provisionally determined correspondence based mainly on the structure other than the periodic structure. Therefore, a possibility of relating unit structures each comprising one period of the periodic structure but not corresponding to each other is reduced between the three-dimensional images, and the correspondence can be finally determined with higher accuracy.

In addition, since the correspondence is determined automatically, a burden on a user can be reduced.

BRIEF DESCRIPTION OF THE DRAWINGS

FIG. 11A shows a table of region scores representing scores for body regions in respective slices used in the body region recognition processing.

FIG. 11B shows a weight map representing scores for the body regions in the respective slices used in the body region recognition processing.

FIG. 11C shows a cost map representing scores for the body regions in the respective slices used in the body region recognition processing.

FIG. 12 shows an example of a matching curve used in the body region recognition processing.

FIG. 13 is a block diagram that schematically shows the configuration of a vertebral bone detection unit.

FIG. 14 is a flow chart showing the flow of processing carried out by the vertebral bone detection unit.

FIG. 20 schematically shows a problem occurring in the case where a correspondence between two three-dimensional images is found with respect to a structure other than vertebral bones.

FIG. 21 schematically shows a problem occurring in the case where a correspondence between two three-dimensional images is found with respect to vertebral bones alone.

DESCRIPTION OF THE PREFERRED EMBODIMENT

Hereinafter, image analysis and display processing as an embodiment of the present invention will be described with reference to the accompanying drawings. In the image analysis and display processing, body regions of a subject are recognized in a plurality of slice images that are cross sections perpendicular to a body axis direction and comprise each of two three-dimensional images obtained in different examinations, and positional correspondences in the body axis direction are provisionally determined between the two three-dimensional images with respect to the recognized body regions. Thereafter, the provisionally determined correspondences are corrected with respect to a region of interest including mainly a vertebral bone region detected in each of the slice images, and the slice images corresponding to each other between the two three-dimensional images are displayed together based on the corrected correspondences with respect to the vertebral bones.

Figure 1:
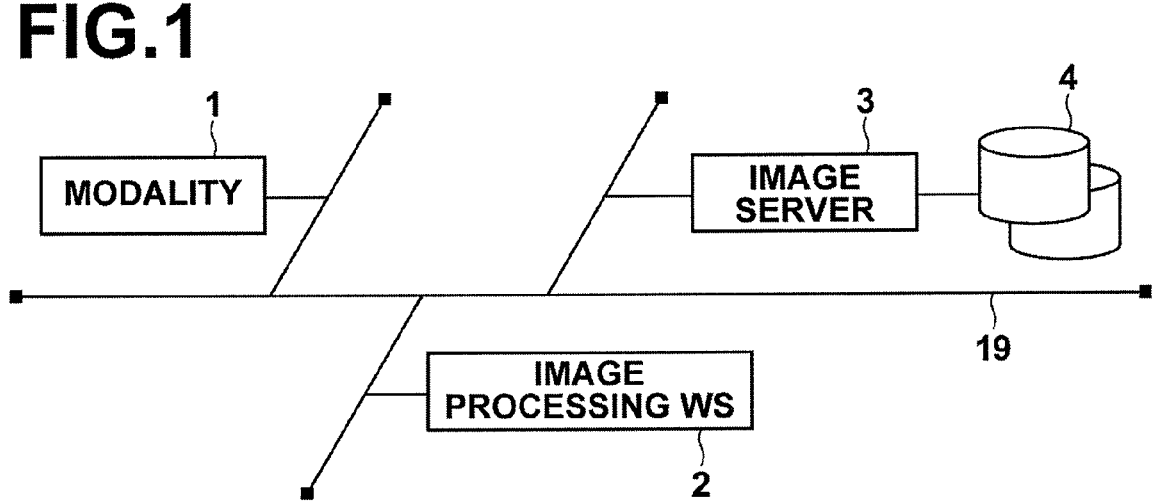
FIG. 1 is a diagram showing the schematic configuration of a medical information system to which an image processing workstation realizing an embodiment of the present invention has been introduced.

FIG. 1 shows the schematic configuration of a medical information system adopting an image processing workstation 2 that realizes the embodiment. As shown in FIG. 1, the system comprises a medical imaging apparatus (a modality) 1, the image processing workstation 2, an image server 3, and an image database 4, all of which are communicably connected to each other via a network 19. The image processing workstation 2 and the image server 3 are controlled by a program installed therein from a recording medium such as a CD-ROM. The program may have been installed therein after being downloaded from a server connected via a network such as the Internet.

The modality 1 includes an apparatus that generates a data set of an image representing a body region of a subject through imaging of the body region and outputs the image data set while adding accompanying information such as examination information and patient information thereto. The accompanying information is in a standardized format such as DICOM or in a format according to a manufacturer of the modality or the like. As an example of the modality 1, an apparatus of CT (Computed Tomography), MRI (magnetic Resonance Imaging), PET (Positron Emission Tomography), or ultrasonography can be listed. In this embodiment, the image data set is a data set of a three-dimensional image representing a body region of a subject examined by CT, MRI, or the like. The image data set is a set of image data representing axial images (that is, slice images) obtained in a predetermined slice thickness or interval.

The image processing workstation 2 is a computer comprising a processor, one or more high-definition displays (hereinafter collectively referred to as the display), input devices such as a mouse and a keyboard, and a communication interface that carries out communication with the image server 3 or the like via the network 19. The image processing workstation 2 has a software program installed therein for carrying out image processing such as various kinds of image analysis on an inputted image data set representing an examined body region of a subject and for displaying a processed image in various kinds of display manner on the display. The image analysis and display processing in this embodiment of the present invention is realized by execution of the program of image analysis and display by the image processing workstation 2.

The image server 3 is a general-purpose comparatively high-performance computer wherein a software program that provides functions of DataBase Management System (DBMS) has been installed. The image server 3 has a large-capacity storage comprising the image database 4. The storage may be a large-capacity hard disc connected to the image server 3 via a data bus, or a disc device connected to NAS (Network Attached Storage) or SAN (Storage Area Network) connected to the network 19. The image server 3 also has a communication interface that communicates with the modality 1, the image processing workstation 2, and the like via the network 19, whereby the image server 3 receives data sets of images obtained by the modality 1 through imaging, registers the data sets with the image database 4, extracts an image data set matching a search condition from image data sets registered with the image database 4 according to a search request from the image processing workstation 2, and sends the extracted image data set to the image processing workstation 2 having requested the search.

The network 19 is a local area network connecting various kinds of apparatuses in a hospital. However, in the case where another image processing workstation 2 is also installed in another hospital or clinic, the network 19 may connect local area networks of the respective facilities via the Internet or a dedicated line. In either case, it is preferable for the network 19 to be an optical network or the like that can realize fast image information transfer.

Figure 2:
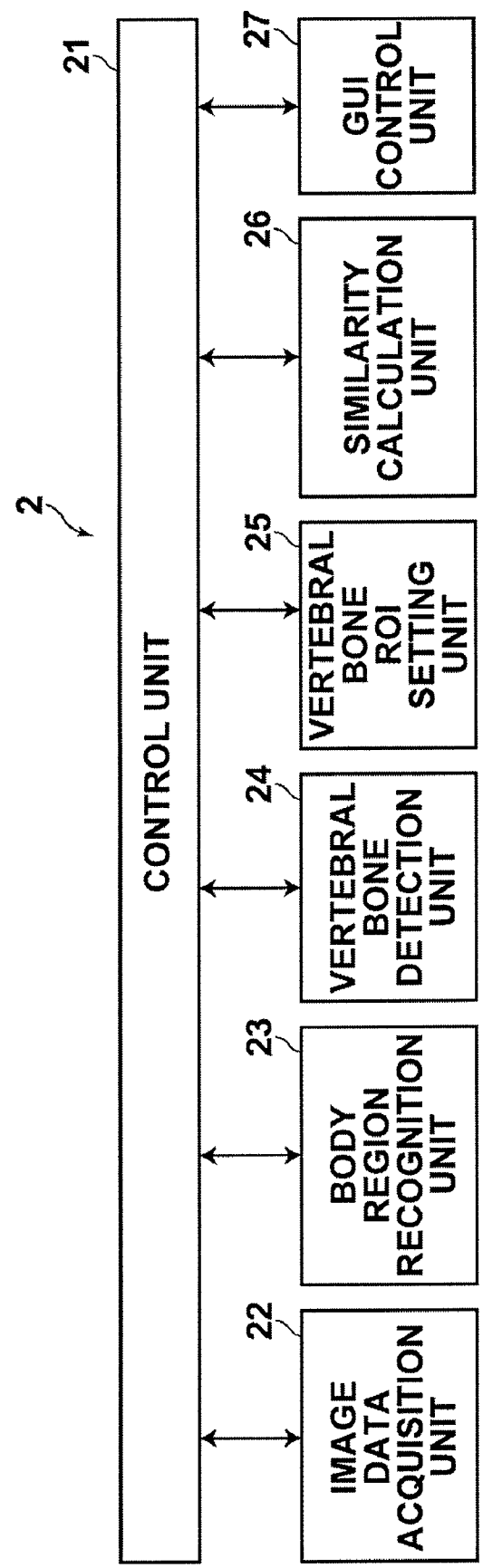
FIG. 2 is a functional block diagram of the image processing workstation realizing the embodiment of the present invention.

FIG. 2 is a functional block diagram that schematically shows functions to realize the image analysis and display processing of this embodiment installed as part of functions of the image processing workstation 2. As shown in FIG. 2, the image analysis and display processing of the present invention is realized by a control unit 21, an image data acquisition unit 22, a body region recognition unit 23, a vertebral bone detection unit 24, a vertebral bone ROI setting unit 25, a similarity calculation unit 26, and a GUI control unit 27.

The control unit 21 controls the entire image analysis and display processing in this embodiment. More specifically, the control unit 21 determines a data set to be processed by the image data acquisition unit 22, the body region recognition unit 23, the vertebral bone detection unit 24, the vertebral bone ROI setting unit 25, the similarity calculation unit 26, and the GUI control unit 27, and calls the functions in predetermined order. In addition, the control unit 21 determines and corrects positional relationships between tomographic images of two three-dimensional images to be processed by use of results of processing by each of the units, which is realized by execution of a main program of the image analysis and display program of the present invention. At the time of start of the program in this embodiment, starting parameters such as examination ID and series ID are given as information to identify image data sets of the two three-dimensional images to be processed. The processing carried out by the control unit 21 will be described in detail, with reference to FIG. 3 or the like.

The image data acquisition unit 22 requests the image server 3 to carry out a search, in response to input of the examination ID, the series ID, and the like thereto. According to the request, the image server 3 searches the image database 4, and extracts the target image data sets of the two three-dimensional images related to the examination ID, the series ID, and the like. The image server 3 sends the image data sets to the image processing workstation 2, and the image data acquisition unit 22 receives the image data sets to store the data sets in a predetermined area in a hard disc of the workstation 2. As a manner of storing the data sets, each of the slice images comprising each of the three-dimensional images may be stored as one image file. The image files of the slice images in each of the three-dimensional images are related to each other and managed in a folder (a directory) of a corresponding one of the three-dimensional images. In a header of each of the image files, the accompanying information such as slice number, slice interval, and slice position is stored, and each of the units can obtain a portion of the information necessary therefor.

Figure 4:
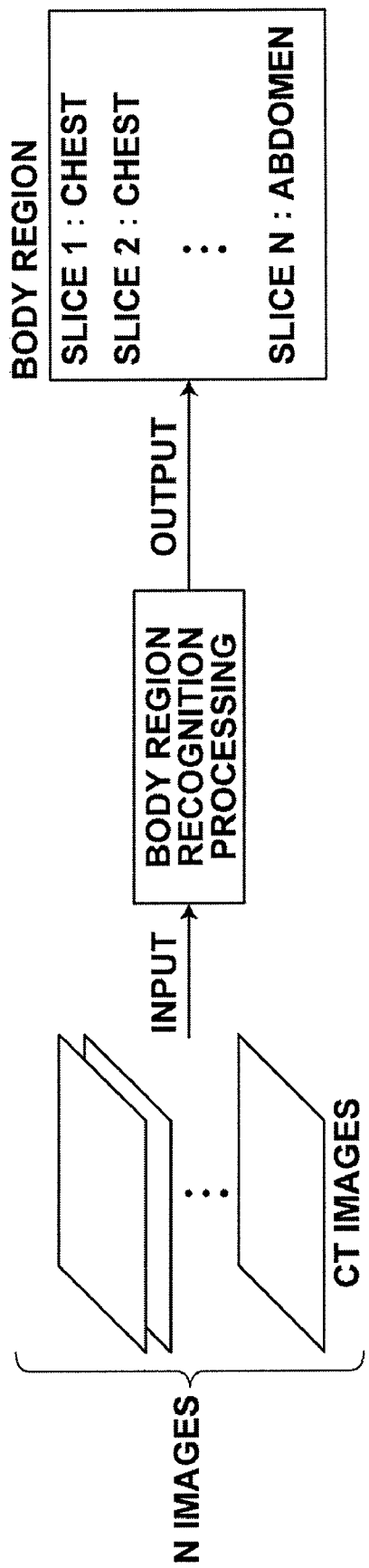
FIG. 4 schematically shows an outline of body region recognition processing.

The body region recognition unit 23 recognizes a body region (an imaged body region) of a subject included in each of slice images 1 to N constituting one three-dimensional image inputted thereto, as shown schematically in FIG. 4. The body region recognition unit 23 stores a result of the recognition in the form of a list relating the slice number and the recognized body region, in a predetermined memory area in the image processing workstation 2. In the case where the subject is a human body, the imaged body region to be recognized refers to a head region, a head and neck region, a neck region, a chest region, a chest and abdomen region, an abdomen region, a pelvis region, and a leg region, for example. At the time of recognition of each of the body regions, a score representing likelihood of each of the body regions is calculated for each of the slice images by classifiers obtained through learning according to Adaboost method using various types of feature values such as a ratio of an air or bone region to a body region, and a ratio of an area of the body region to an area of a circle having the same perimeter length as the body region (that is, a degree of circularity). According to dynamic programming using the scores, the imaged body region is determined for each of the slice images so as to conform to anatomical positional relationships of human body. Therefore, since the various types of feature values are used to determine the imaged body region in each of the slice images, information on vertebral bone regions in each of the slice images does not contribute very much to the body region recognition result. The body region recognition processing will be later described in detail with reference to FIGS. 9 to 12, for example.

The vertebral bone detection unit 24 detects a vertebral bone (see the upper image in FIG. 7) included in each of the slice images of each of the three-dimensional images inputted thereto, by using classifiers having learned images of spinal column by Adaboost method. The vertebral bone detection unit 24 stores coordinates of a detected point representing the center of the vertebral bone in each of the slice images in each of the three-dimensional images, in a predetermined memory area of the image processing workstation 2. The vertebral bone detection processing will be described in detail with reference to FIGS. 13 to 19, for example.

Figure 7:
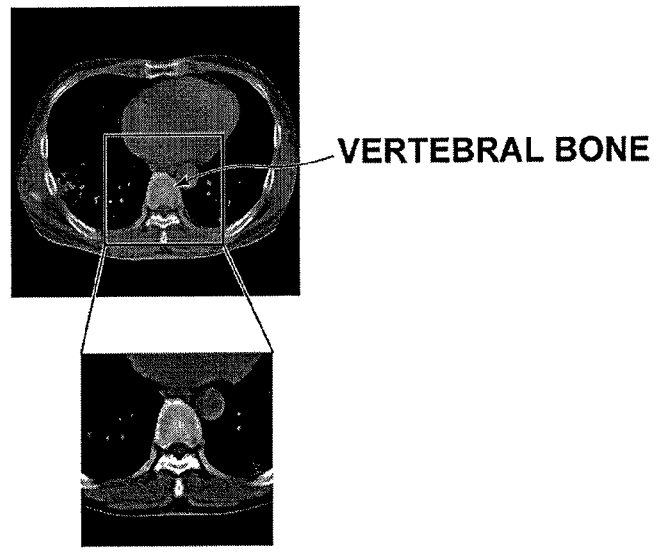
FIG. 7 shows an example of setting a region of interest including a vertebral bone in a tomographic image of a subject and an enlargement of the region of interest.

The vertebral bone ROI setting unit 25 sets a region of a predetermined size centering the detected point (such as a rectangular region of 256×256 pixels exemplified in the lower image in FIG. 7) as a region of interest (ROI) in each of the slice images inputted thereto after the detected point has been determined. The vertebral bone ROI setting unit 25 stores a subset of the image data corresponding to the region of interest, in a predetermined memory area in the image processing workstation 2.

The similarity calculation unit 26 finds values representing correlation of pixel values between the regions of interest, by using the subsets of image data representing the regions of interest inputted thereto as targets of similarity calculation. The similarity calculation unit 26 stores the calculated correlation values by relating the values to the slice numbers of the slice images including the subsets of image data representing the inputted regions of interest, in a predetermined memory area in the image processing workstation 2. This processing assumes that the two three-dimensional images have been obtained by the same modality. In the case where the two inputted three-dimensional images have been obtained by different modalities, mutual information is found between the two images. Alternatively, whether the correlation values or the mutual information are/is used may be determined by receiving a starting parameter representing the modality of each of the inputted images at the time the similarity calculation unit 26 is called. In addition, different similarity calculation units 26 may be prepared for respective modalities of the inputted image data so that the control unit 21 can call an appropriate one of the similarity calculation units 26 according to the modality 1 of each of the inputted image data sets.

The GUI control unit 27 controls a graphical user interface of the image processing workstation 2. The GUI control unit 27 carries out control to display two of the slice images together on the display of the image processing workstation 2 based on the image data sets thereof inputted for display. The GUI control unit 27 also carries out control to display a predetermined menu screen on the display of the workstation 2, and receives operation of the input devices such as the mouse and the keyboard, for example.

The flow of the image analysis and display processing as the embodiment of the present invention will be described next, with reference to a flow chart shown in FIG. 3. The processing is carried out in the flow, by cooperation of the processing executed by the respective units other than the control unit 21 in the image processing workstation 2 and by each unit in the image server 3, based on the control by the control unit 21 of the image processing workstation 2.

When the image analysis and display program of the present invention is started in the image processing workstation 2, the control unit 21 obtains from the starting parameters the examination ID, the series ID, and the like representing the two three-dimensional images to be processed. The control unit 21 then calls the image data acquisition unit 22, and hands over the examination ID, the series ID, and the like obtained from the starting parameters to the image data acquisition unit 22. The image data acquisition unit 22 sends to the image server 3 a search request using the examination ID, the series ID, and the like as search keys, and receives from the server 3 the image data sets that match the search request and have been extracted through a search of the image database 4 by the server 3. The image data acquisition unit 22 stores the image data sets as the image data files of the slice images in the predetermined memory area of the hard disc of the image processing workstation 2, and sends a image data acquisition completion message to the control unit 21 (#1).

The control unit 21 then causes the GUI control unit 27 to display each of the slice images in the two three-dimensional images and to receive specification of a reference slice image (#2). More specifically, the control unit 21 calls the GUI control unit 27, and hands over to the GUI control unit 27 information (such as file name) that identifies the image data of the first slice image in each of the three-dimensional images obtained by the image data acquisition unit 22. Based on the image data, the GUI control unit 27 displays the first slice images of the respective three-dimensional images on the display. When a user clicks one of the slice images on the display and carries out a mouse wheel operation on the slice image, the GUI control unit 27 regards the operation as a display changing request regarding the clicked slice image, and hands over the request to the control unit 21. In response to the request, the control unit 21 hands over to the GUI control unit 27 information that identifies the image data of a subsequent one of the slice images in the clicked three-dimensional image. Based on the information from the control unit 21, the GUI control unit 27 causes the display to display the subsequent slice image. By repeating the operation, the user can sequentially display the slice images of one of the three-dimensional images. When the user carries out an operation to select "Display of Corresponding Slice" from a menu or the like on the screen at the time of display of a desired one of the slice images in the three-dimensional image as a target of sequentially changing display, for example, the GUI control unit 27 receives the operation as a display request for a corresponding one of the slice images in the other three-dimensional image, and hands over the request to the control unit 21. In response to reception of the request, the control unit 21 stores in a predetermined memory area the information that identifies the currently displayed slice image in the three-dimensional image as the target of sequentially changing display, as information that identifies the reference slice image.

The control unit 21 then causes the body region recognition unit 23 to carry out the body region recognition processing on the inputted image data sets of the two three-dimensional images obtained by the image data acquisition unit 22 and (#3). More specifically, the control unit 21 calls the body region recognition unit 23, and hands over information that identifies the data set of one of the three-dimensional images obtained by the image data acquisition unit 22. The body region recognition unit 23 carries out image analysis processing to recognize the body region of the subject represented by each of the slice images in the three-dimensional image inputted thereto. The body region recognition unit 23 stores the result of recognition in the predetermined memory area, and sends a processing completion message to the control unit 21. The control unit 21 causes the body region recognition unit 23 to carry out the same processing on the image data set of the other three-dimensional image obtained by the image data acquisition unit 22.

As has been described in Japanese Unexamined Patent Publication No. 2008-006188, the control unit 21 firstly relates positions of boundaries between the different body regions in the two three-dimensional images, based on the result of the recognition by the body region recognition unit 23. Thereafter, regarding the slice images recognized to represent the same body region between two of the boundaries, the control unit 21 relates to each other the slice images in which relative positions in the body axis direction agree with each other. The control unit 21 then determines provisional correspondences in the positions in the body axis direction between the slice images in the two three-dimensional images, by further relating the slice images to each other between one end (such as the top or bottom) of the three-dimensional images and one of the boundaries, sequentially from the boundary (#4).

Figure 5:
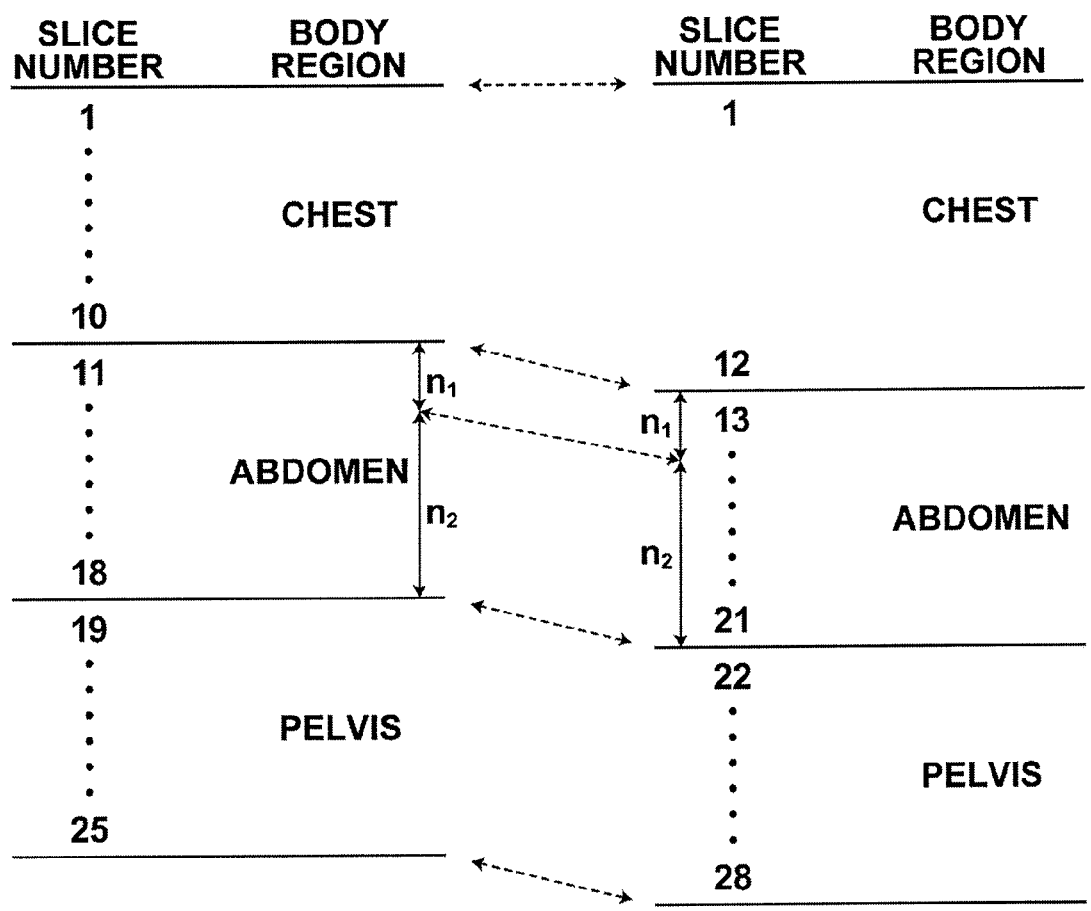
FIG. 5 schematically shows an example of provisional determination of correspondences between two three-dimensional images, based on a result of the body region recognition processing.

FIG. 5 schematically shows an example of the provisionally determined correspondences based on the body region recognition result between two three-dimensional images $V_1$ and $V_2$. In this example, attention is paid to a position of the boundary between the chest region and the abdomen region, and slice images numbered 10 and 11 in the three-dimensional image $V_1$ are related to slice images numbered 12 and 13 in the three-dimensional image $V_2$. In addition, attention is paid to a position of the boundary between the abdomen region and the pelvis region, and slice images numbered 18 and 19 in the three-dimensional image $V_1$ are related to slice images numbered 21 and 22 in the three-dimensional image $V_2$. For the slice images recognized to represent the abdomen region between the two boundaries, the slice images are related to each other at positions that internally divide the distances from the boundary of the chest and abdomen regions to the boundary of the abdomen and pelvis regions in the three-dimensional images into a ratio of $n_1:n_2$, for example. Furthermore, for the slice images recognized as the chest region from the top of the images to the boundary of the chest and abdomen regions, slice images numbered 9, 8, 7 and so on in the three-dimensional image $V_1$ are respectively related to slice images 11, 10, 9, and so on in the three-dimensional image $V_2$. For the slice images recognized as the pelvis region between the boundary of the abdomen and pelvis regions and the bottom of the images, slice images numbered 20, 21, 22 and so on in the three-dimensional image $V_1$ are respectively related to slice images numbered 23, 24, 25, and so on in the three-dimensional image $V_2$.

The relating between the slice images other than the boundaries by using the ratio or the like within the body regions may be carried out by using the slice numbers alone or according to coordinate value calculation using the slice interval and/or coordinate values of the slice positions.

Figure 6:
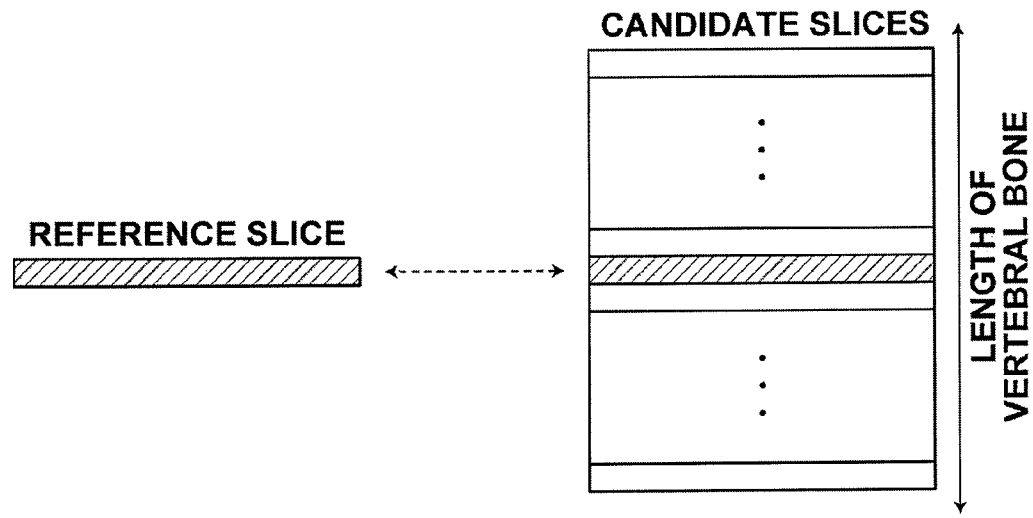
FIG. 6 schematically shows a manner of determining a reference slice image and candidate slice images.

After the correspondences between the two three-dimensional images have been provisionally determined in the body axis direction based on the body region recognition result, the control unit 21 determines candidate slice images in the other three-dimensional image as candidates for slice images related newly to the reference slice image by correction (#5), in order to correct the correspondences based on the body region recognition to correspondences based on the spinal column (the vertebral bones). More specifically, the control unit 21 reads the information of the reference slice image specified at Step #2 (in the three-dimensional image $V_1$, in this case) from the memory area, and identifies the slice image that belongs to the three-dimensional image $V_2$ and has been regarded to correspond to the reference slice image in the three-dimensional image $V_1$ based on the body region recognition result determined provisionally at Step #4, as shown in FIG. 6. The control unit 21 determines, as the candidate slice images, slice images whose slice positions are located within a range shorter than a length of a vertebral bone in the body axis direction around the slice position of the identified slice image in the body axis direction. The vertebral bone length in the body axis direction may be defined in advance as a setting file or a starting parameter of the program, based on anatomical knowledge such as mean, variance, and the like of vertebral bone sizes of human body, and can actually be set as approximately 3 cm. As a method of determining the candidate slice images, the slice interval of the slice images may be obtained from the accompanying information, to find the quantity of the slice images that can be located within the vertebral bone length in the body axis direction. The candidate slice images are determined to be the slice images of the quantity centering the slice image that has been provisionally related to the reference slice image. Alternatively, the slice positions (the coordinates) of the respective slice images may be obtained from the accompanying information, to find a range of the slice positions in which the candidate slice images can be located, through calculation of coordinates according to the slice positions and the vertebral bone length in the body axis direction. The slice images within the range can be determined as the candidate slice images.

The control unit 21 then causes the vertebral bone detection unit 24 to carry out vertebral bone detection processing on the image data of the reference slice image and the candidate slice images (#6). More specifically, the control unit 21 calls the vertebral bone detection unit 24, and hands over information that identifies the image data set of one of the three-dimensional images. The vertebral bone detection unit 24 carries out image analysis processing to detect vertebral bones in the slice images by using the data set of the three-dimensional image inputted thereto. The vertebral bone detection unit 24 stores coordinates of the detected point of the vertebral bone in each of the slice images in the predetermined memory area, and sends a processing completion message to the control unit 21. The control unit 21 causes the vertebral bone detection unit 24 to carry out the same processing on the other three-dimensional image.

The control unit 21 further causes the vertebral bone ROI setting unit 25 to set the region of interest including mainly the vertebral bone in the reference slice image and each of the candidate slice images (#7). More specifically, the control init 21 calls the vertebral bone ROI setting unit 25, and hands over information for identifying the image data of the reference slice image and one of the candidate slice images and information of the coordinates of the detected points regarding the vertebral bones therein. Based on the information inputted thereto, the vertebral bone ROI setting unit 25 sets the region of interest centering the detected point in each of the two slice images, and stores the subsets of image data corresponding to the regions of interest in the predetermined memory area. The vertebral bone ROI setting unit 25 then sends a processing completion message to the control unit 21. The control unit 21 causes the vertebral bone ROI setting unit 25 to carry out the same processing on the reference slice image and each of the other candidate slice images.

The control unit 21 causes the similarity calculation unit 26 to calculate the similarity between the regions of interest in the reference slice image and each of the candidate slice images (#8). More specifically, the control unit 21 calls the similarity calculation unit 26, and hands over information that identifies the subsets of image data of the regions of interest in the reference slice image and one of the candidate slice images. Based on the information inputted thereto, the similarity calculation unit 26 obtains the subsets of image data of the regions of interest in the two images, and calculates the similarity (the correlation value or the mutual information) between the regions. The similarity calculation unit 26 stores a result of the calculation in the predetermined memory area, and sends a processing completion message to the control unit 21. The control unit 21 causes the similarity calculation unit 26 to carry out the similarity calculation in the same manner, between the region of interest in the reference slice image and the region of interest in each of the other candidate slice images.

Based on the similarity between the region of interest in the reference slice image and the region of interest in each of the candidate slice images calculated by the similarity calculation unit 26, the control unit 21 corrects the correspondences between the two three-dimensional images based on the result of body region recognition to the correspondences based on the spinal column (the vertebral bones) by newly relating the reference slice image to one of the candidate slice images having the region of interest whose similarity with the reference slice image is largest (#9). At this time, the correspondences between the other slice images in the two three-dimensional images are sequentially corrected based on an amount of shift (a change in the quantity of slice images or in the coordinate values of the slice positions) of the slice images respectively corresponding to the reference slice image before and after the correction.

The control unit 21 finally causes the GUI control unit 27 to display on the display of the image processing workstation 2 the both slice images related to each other by the correspondences having been determined according to the vertebral bones in the correction at Step #9 (#10). More specifically, the control unit 21 calls the GUI control unit 27, and hands over information that identifies the data of the two slice images corresponding to each other. Based on the information inputted thereto, the GUI control unit 27 obtains the data of the two slice images and causes the images to be displayed on the display. At this time, in response to a trigger such as an operation by the user or at a predetermined time interval, both of the two corresponding slice images to be displayed may be changed sequentially. More specifically, the GUI control unit 27 notifies the control unit 21 of the trigger at the time of detection of the trigger, and the control unit 21 newly sends information that identifies the data of the two slice images to be displayed next to the GUI control unit 27, as in Step #2 described above.

Figure 8:
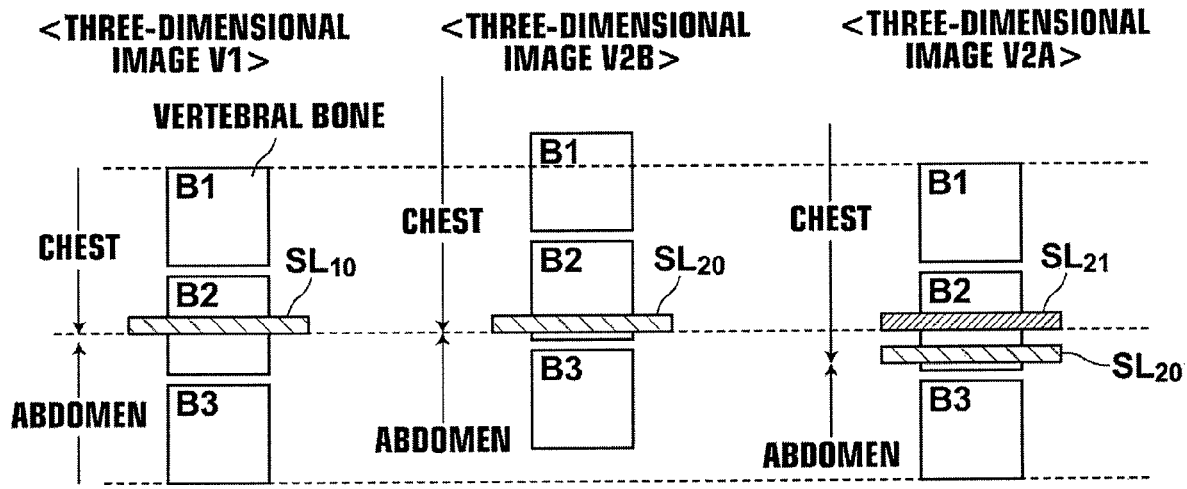
FIG. 8 schematically shows a manner of determination and correction of the correspondences between the three-dimensional images, in cross sections parallel to the body axis of the three-dimensional images.

FIG. 8 schematically exemplifies how the correspondences between the two three-dimensional images $V_1$ and $V_2$ are determined and corrected according to this embodiment, in cross sections that are parallel to the body axis of the two three-dimensional images. In FIG. 8, a three-dimensional image $V_{2B}$ represents the three-dimensional image $V_2$ before the correction of the correspondences while a three-dimensional image $V_{2A}$ represents the three-dimensional image $V_2$ after the correction of the correspondences. According to the embodiment of the present invention, the control unit 21 firstly determines the correspondences between the three-dimensional images $V_1$ and $V_{2B}$, based on the result of body region recognition carried out by the body region recognition unit 23. In FIG. 8, a slice image $SL_{10}$ whose slice position is at the boundary between the chest and abdomen regions in the three-dimensional image $V_1$ is related to a slice image $SL_{20}$ of the three-dimensional image $V_{2B}$. The control unit 21 then sets the reference slice image (that is, the slice image $SL_{10}$ in FIG. 8) in the three-dimensional image $V_1$, and determines as the candidate slice images the slice images located within the vertebral bone length in the body axis direction centering the slice image (the slice image $SL_{20}$ in FIG. 8) in the three-dimensional image $V_{2B}$ corresponding to the reference slice image in the three-dimensional image $V_1$. The control unit 21 causes the vertebral bone detection unit 24 and the vertebral bone ROI setting unit 25 to set the region of interest that mainly includes the vertebral bone in the reference slice image and in each of the candidate slice images. The control unit 26 then causes the similarity calculation unit 26 to calculate the similarity between the region of interest in the reference slice image $SL_{10}$ and the region of interest in each of the candidate slice images. The control unit 21 corrects the correspondences by newly relating the reference slice image to the candidate slice image (a slice image $SL_{21}$ in FIG. 8) having the region of interest whose similarity with the region of interest in the reference slice image $SL_{10}$ is highest. In this manner, the correspondences between the three-dimensional images $V_1$ and $V_2$ are corrected from the correspondences between the three-dimensional image $V_1$ and $V_{2B}$ based on the result of body region recognition to the correspondence between the three-dimensional image $V_1$ and $V_{2A}$ based on positions of the vertebral bones, as shown in FIG. 8. Based on the correspondences, the two corresponding slice images in the three-dimensional images $V_1$ and $V_2$ displayed together on the display of the image processing workstation 2 (such as the slice images $SL_{10}$ ad $SL_{21}$) represent the same vertebral bone position and are very easy to view, which meets a demand of users actually carrying out image interpretation.

In addition, the control unit 21 determines the candidate slice images corresponding to the reference slice image $SL_{10}$ of the three-dimensional image $V_1$, within the range shorter than the vertebral bone length in the body axis direction around the detected point of the vertebral bone. Therefore, the slice images including the texture of vertebral bones similar to the slice image $SL_{10}$, such as the texture at the center of vertebral bone B1 or B3 in FIG. 8, are excluded from the candidate slice images, and correction of the correspondences based on different vertebral bones can be avoided. Consequently, the correction of the correspondences based on the vertebral bones can be carried out with extremely high accuracy.

Furthermore, the processing described above is automatically carried out according to the control by the control unit 21 in the image processing workstation 2. Therefore, a burden on the user to manually set the corresponding slice images can also be reduced.

Hereinafter, the body region recognition processing carried out by the body region recognition unit 23 and the vertebral bone detection processing carried out by the vertebral bone detection unit 24 will be described more in detail.

(1) Details of the Body Region Recognition Processing

Hereinafter, a method proposed by the assignee in Japanese Patent application No. 2007-104846 will be described.

Figure 9:
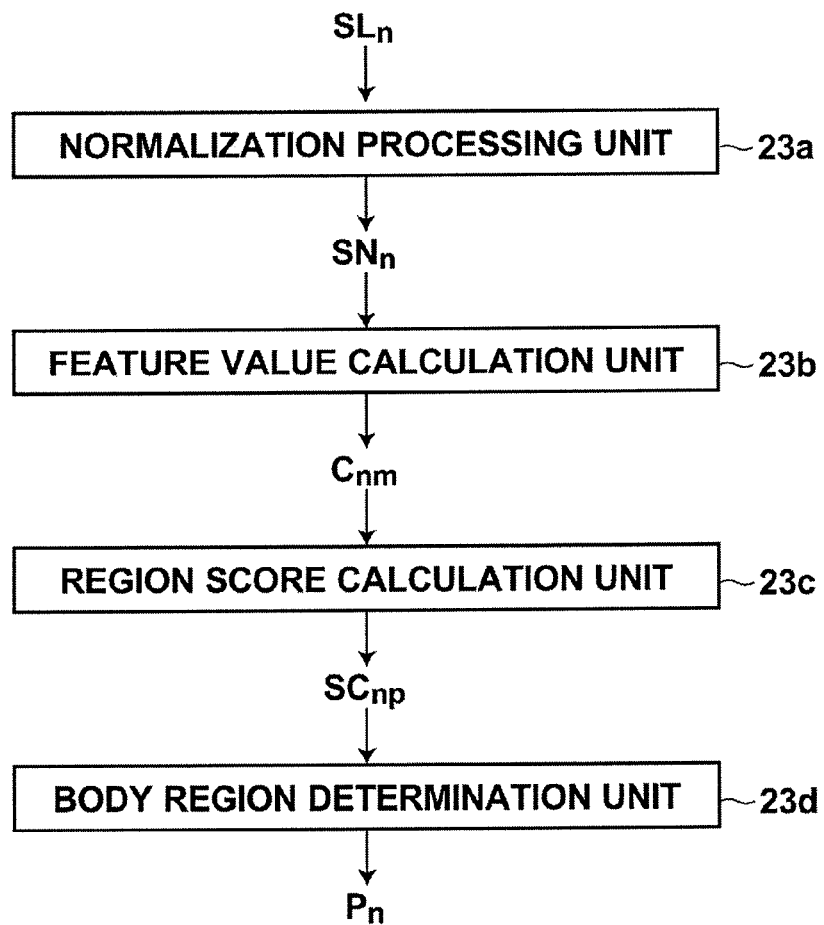
FIG. 9 is a block diagram that schematically shows the configuration of a body region recognition unit.

FIG. 9 is a block diagram showing in detail the processing carried out by the body region recognition unit 23. As shown in FIG. 9, the body region recognition unit 23 comprises a normalization processing unit 23*a*, a feature value calculation unit 23*b*, a region score calculation unit 23*c*, and a body region determination unit 23*d*. The normalization processing unit 23*a* carries out normalization processing on tomographic images $SL_n$ (n=1, 2, ... ) inputted thereto. The feature value calculation unit 23*b* calculates feature values $c_{nm}$ (m=1, 2, ... ) from tomographic images $SN_n$ having been subjected to the normalization processing. The region score calculation unit 23*c* calculates scores $sc_{np}$ (p=head, head-neck, neck, chest, chest-abdomen, abdomen, pelvis, and leg regions) representing likelihoods of the respective regions, by inputting the feature values $c_{nm}$ calculated for each of the normalized tomographic images $SN_n$ to the classifiers generated by Adaboost method. The body region determination unit 23*d* determines a body region $P_n$ represented in each of the inputted tomographic images $SL_n$ while maintaining the order of the body regions described above, by using dynamic programming and the calculated region scores $sc_{np}$ inputted thereto.

The normalization processing unit 23*a* extracts a human body region from each of the inputted tomographic images $SL_n$, calculates landmarks (that is, reference points) from information on the extracted human body region, and generates the normalized tomographic images $SN_n$ by carrying out Affine transform such as enlargement, reduction, translation, and rotation of each of the inputted images with respect to the calculated landmarks. This normalization processing is carried out to remove variance in size and angle of the human body regions in the inputted tomographic images $SL_n$ caused by individual differences, imaging condition differences, and the like, and to improve efficiency and accuracy of the body region recognition processing that will be described later by aligning positions of structures (such as bone regions and air regions) in the human body regions.

Any method known before execution of the present invention can be used to extract the human body regions from the inputted tomographic images $SL_n$. For example, a method described in Japanese Unexamined Patent Publication No. 9(1997)-187444 may be used. In this method, the inputted tomographic images $SL_n$ are subjected to binarization processing and noise removal processing, and contours as body region candidates are extracted through contour extraction processing. A portion of the extracted contours surrounding an area smaller than a predetermined threshold value is excluded, and a region surrounded by the remaining portion of the contours is judged to be a human body region.

Figure 10A:
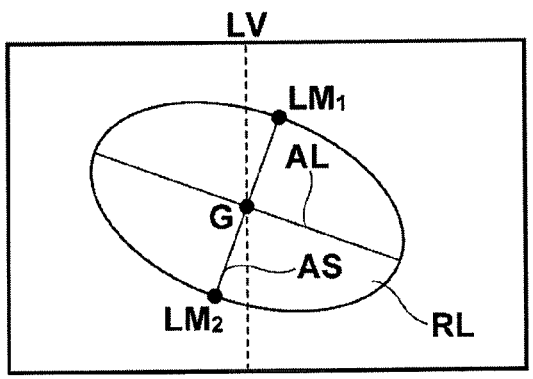
FIG. 10A schematically shows how landmarks are set for normalization of a tomographic image, in the case of labeling number being 1 representing a horizontally elongated body region.
Figure 10B:
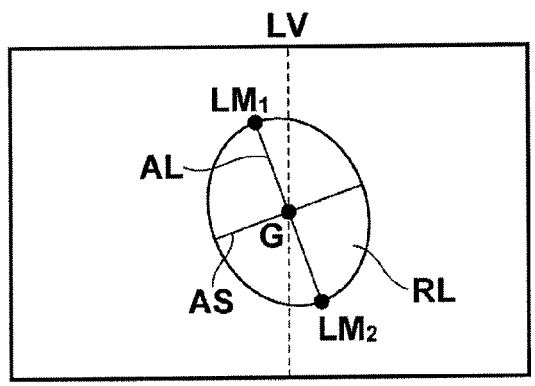
FIG. 10B schematically shows how the landmarks are set for normalization of a tomographic image, in the case of labeling number being 1 representing a vertically elongated body region.
Figure 10C:
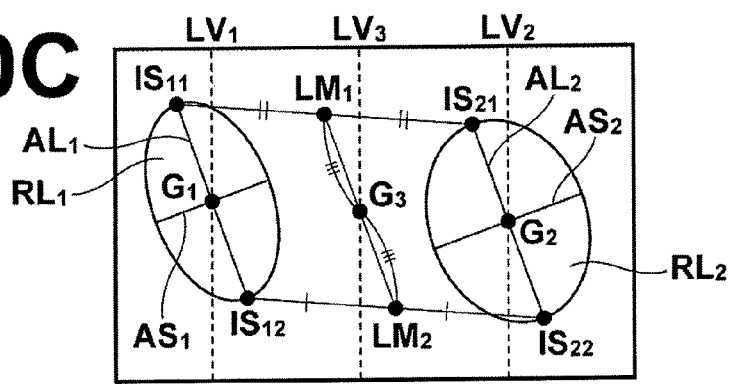
FIG. 10C schematically shows how the landmarks are set for normalization of a tomographic image, in the case of labeling number being 2.
Figure 10D:
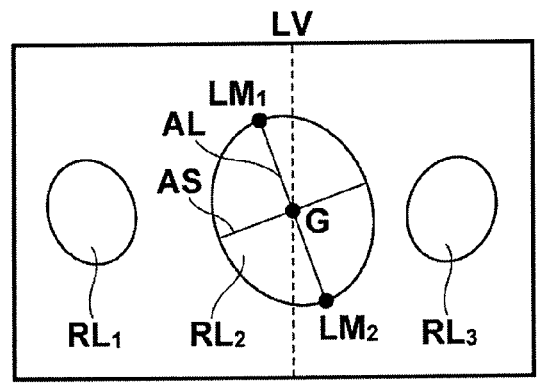
FIG. 10D schematically shows how the landmarks are set for normalization of a tomographic image, in the case of labeling number being 3.

The landmarks can be two points as intersection points of the contours and a median plane, for example. More specifically, the landmarks can be found as shown in FIGS. 10A to 10D according to a labeling number obtained by labeling processing on the extracted human body regions. In the case where the labeling number is 1 as shown in FIGS. 10A and 10B, the center of mass denoted by G in a labeled region (a human body region) RL is firstly found. A long axis AL and a short axis AS both passing through the center of mass G are set in the human body region, and a vertical straight line LV passing through the center of mass G is also set in the corresponding tomographic image $SL_n$. Intersection points of the contour of the body region RL and either the long axis AL or the short axis AS forming smaller acute angles with the vertical line LV are then used as landmarks $LM_1$ and $LM_2$. FIG. 10A schematically shows the case where the short axis AS forms the smaller acute angles with the vertical line LV than the long axis AL, which corresponds to an image of chest, chest and abdomen, abdomen, or pelvis region. FIG. 10B schematically shows the case where the long axis AL forms the smaller acute angles with the vertical line LV than the short axis AS, which represents an image of head, head and neck, or neck region. FIG. 10C shows the case where the labeling number is 2, which corresponds to an image of leg region. In this case, the centers of mass denoted by $G_1$ and $G_2$ are firstly found for respective labeled regions $RL_1$ and $RL_2$. Long axes $AL_1$ and $AL_2$ and short axes $AS_1$ and $AS_2$ passing respectively through the centers of mass $G_1$ and $G_2$ are set in the labeled regions $RL_1$ and $RL_2$, and vertical straight lines $LV_1$ and $LV_2$ passing respectively through the centers of mass $G_1$ and $G_2$ are also set in the corresponding tomographic image $SL_n$. Intersection points of the contours of the body regions $RL_1$ and $RL_2$ and either the short axes $AS_1$ and $AS_2$ or the long axes $AL_1$ and $AL_2$ forming smaller acute angles respectively with the vertical lines $LV_1$ and $LV_2$ are denoted by $IS_{11}$, $IS_{12}$, $IS_{21}$, and $IS_{22}$ in the labeled regions $RL_1$ and $RL_2$. Midpoints of line segments $IS_{11}IS_{21}$ and $IS_{12}IS_{22}$ not crossing each other are then used as landmarks $LM_1$ and $LM_2$, respectively. In the case where a ratio between areas of the two labeled regions is not within a predetermined range, that is, the case where a difference in the areas of the two labeled regions exceeds a predetermined threshold value, one of the labeled regions having a smaller area is judged to represent a medical instrument or the like, and the other region having a larger area is subjected to the same processing as for the case of the labeling number being 1. FIG. 10D shows the case of the labeling number being 3, and corresponds to an image representing the neck region and both arms. In this case, landmarks $LM_1$ and $LM_2$ are found in the same manner as for the case where the labeling number is 1, in one of labeled regions denoted by $RL_1$, $RL_2$, or $RL_3$ having a maximum area (the region $RL_2$ in this case). In the case where distances of the landmarks $LM_1$ and $LM_2$ to the line LV exceed a predetermined threshold value in FIGS. 10A, 10B, and 10D, correction processing may be carried out so that positions of the landmarks $LM_1$ and $LM_2$ are moved closer to the line LV along the contour of the corresponding labeled region RL. Likewise, in the case where distances of the landmarks $LM_1$ and $LM_2$ in FIG. 10C to a vertical straight line $LV_3$ passing through a midpoint G3 of a line segment $LM_1LM_2$ in the tomographic image $SL_n$ exceed a predetermined threshold value, correction processing may be carried out so that positions of the landmarks $LM_1$ and $LM_2$ can be moved closer to the line $LV_3$ along the line segments $IS_{11}IS_{21}$ and $IS_{12}IS_{22}$. As an example of the movement, the positions of the landmarks $LM_1$ and $LM_2$ can be moved to reduce the distances to the line LV or $LV_3$ by 20%.

With respect to the landmarks $LM_1$ and $LM_2$ having been found in the above manner, each of the images is normalized through Affine transform or the like so as to cause the two landmarks $LM_1$ and $LM_2$ to be disposed at the center in horizontal direction in the tomographic image $SL_n$ and to cause the distance between the two landmarks to have a predetermined value.

The feature value calculation unit 23b calculates the various types of feature values $c_{nm}$ from the normalized tomographic images $SN_n$. As examples of the feature values $c_{nm}$, pixel values in a block (such as 3×3 pixels) in each of the normalized tomographic images $SN_n$ may be used, as well as a mean, a maximum, a minimum, and a median thereof. Furthermore, a ratio of an air or bone region to the human body region extracted by thresholding processing based on CT values may also be used as one of the feature values, in addition to a proportion of the area of the human body region to a circle having the same perimeter length as the human body region (that is, a degree of circularity), for example. The feature values may be calculated values themselves or multinarized values thereof.

The region score calculation unit 23c inputs the feature values $c_{nm}$ to groups of classifiers generated for the respective body regions through Adaboost learning, and calculates the region scores $sc_{np}$ representing the likelihoods of the respective body regions for each of the tomographic images $SL_n$. The groups of classifiers for the body regions have been obtained through learning according to Adaboost method, by using the various types of feature values calculated in the same manner as has been described above from each of learning samples comprising images known to represent the body regions and images known not to represent the body regions. Each of the groups of classifiers for carrying out judgment on one of the body regions includes one or more classifiers. In the case where the number of the classifiers is 2 or more, the classifiers complementarily carry out the judgment. The same number of groups of classifiers as the number of the body regions to judge are generated, and the types of the feature values used for the judgment are determined for each of the groups of classifiers. The learning and a method of calculation of the region scores have been described in detail in Japanese Unexamined Patent Publication No. 2005-108195, for example. For calculation of the region scores, a method using classifiers generated by another learning method such as Artificial Neural Network (ANN), Support Vector Machine (SVM), or Relevance Vector Machine (RVM) may be used, besides the method described above. Moreover, a method using a reference table that determines a region score for one feature value or a combination of feature values may also be used (see U.S. Patent Application Publication No. 20070269089, for example). In addition, the processing carried out by the feature value calculation unit 23b and the region score calculation unit 23c may be replaced by processing in which a region score is a similarity obtained through template matching (see Japanese Unexamined Patent Publication No. 2002-253539, for example) or comparison processing with eigen-images of the body regions (see U.S. Pat. No. 7,245,747, for example).

The region scores $SC_{np}$ are calculated for each of the tomographic images $SL_n$ in the processing described above. FIG. 11A shows an example of a table of the region scores $sc_{np}$ for each of the tomographic images (that is, the slice images) $SL_n$. The table shows that the larger a value of the region score is, the higher a possibility that the image $SL_n$ represents the corresponding region becomes. In this table, the body region having a maximum of the scores $sc_{np}$ in each of the slice images $SL_n$ changes as the head and neck region for the slice image 1, the head and neck region for the slice image 2, the neck region for the slice image 3, the chest region for the slice image 4, the neck region for the slice image 5, and the chest region for slice image 6, which does not agree with the order of human body regions between the slice images 4 to 6. Consequently, the body region determination unit 23d carries out correction thereon.

The body region determination unit 23d finally determines the body region $P_n$ represented in each of the tomographic images $SL_n$ so that the regions having maximum values of the region scores $sc_{np}$ in the respective tomographic images $SL_n$ do not have any disagreement with reference body regions pre-arranged in the order of body regions, that is, the head, head and neck, neck, chest, chest and abdomen, abdomen, pelvis, and leg regions. The body regions $P_n$ are finally determined by finding a path having smallest cost and shortest length, assuming that the cost occurs when the body regions having the maximum region scores $sc_{np}$ in the respective tomographic images $SL_n$ do not agree with the reference body regions. More specifically, a method of solving an optimization problem may be used, and a method using Dynamic Programming (DP matching) will be described in this embodiment as a specific example of the method.

Firstly, based on the region scores $sc_{np}$ shown in FIG. 11A, each of the region scores is subtracted from the maximum value of the region scores $sc_{np}$ in each of the slice images. As a result, as shown in FIG. 11B, a weight map is generated wherein relative order of magnitude relations in the region scores $sc_{np}$ is reversed, that is, wherein the region scores $sc_{np}$ other than the region score $sc_{np}$ of the maximum value are converted into non-negative values while the region score $sc_{np}$ having the maximum value is converted to 0. At the time of generation of the weight map, a conversion using a reference table may be used, instead of the subtraction described above.

The path of the smallest cost is then calculated by DP matching, while using the weight map shown in FIG. 11B as input thereto. Hereinafter, a method proposed by the assignee in Japanese Patent Application No. 2006-140041 (that is, U.S. Patent Application Publication No. 20070269089) will be cited below. By using the weight map shown in FIG. 11B as the input, a cost map exemplified in FIG. 11C is generated. In FIG. 11C, the cost at each cell (n, p) is set in the following manner. Here, n refers to the slice number while p denotes a number representing the body region (that is, 1 for the head region, 2 for the neck region, and 3 for the chest region).

(1, 1): a value of (1, 1) in the weight map (see FIG. 11B)

(n, 1): a value of (n−1, 1) in the weight map+a predetermined value (0, in this case)

(1, m): a value of (1, m−1) in the weight map+a predetermined value (0, in this case)

(n, m): a minimum value in (i) to (iii) below
  (i) a value of (n−1, m−1) in the cost map+a value of (n, m) in the weight map
  (ii) a value of (n, m−1) in the cost map+a value of (n, m) in the weight map+a predetermined value (1.0, in this case)
  (iii) a value of (n−1, m) in the cost map+a value of (n, m) in the weight map+a predetermined value (1.0, in this case)

Thereafter, the minimum values in the respective columns are traced from the right to the left of the cost map, whereby a map relating the slice numbers to the body regions is generated.

Based on a matching curve shown in FIG. 12 having the order of human body regions (the reference body regions) in the vertical axis and having a provisional result of recognition according to the maximum region scores $sc_{np}$ in the respective slice images $SL_n$ in the horizontal axis, the provisional recognition result is replaced by the corresponding reference body regions. In this manner, the body regions of the respective slice images $SL_n$ are finally determined.

(2) Vertebral Bone Detection Processing

Hereinafter, a method proposed by the assignee in Japanese Patent Application No. 2008-054627 will be described.

The vertebral bone detection processing is to find a centerline of one vertebral bone in a plurality of medical images representing cross sections (that is, cross sections perpendicular to the body axis direction in this embodiment) of the vertebral bone at different positions. The vertebral bone detection unit 24 stores coordinates representing the centerline of the vertebral bone in each of the medical images, in a predetermined memory area. FIG. 13 is a block diagram showing the processing carried out by the vertebral bone detection unit 24 in detail. As shown in FIG. 13, the vertebral bone detection unit 24 comprises spinal cord region detection means 24a, spinal cord centerline generation means 24b, and vertebral bone centerline determination means 24c. The spinal cord region detection means 24a sets a surrounding region with respect to a target pixel in each of the medical images, and judges whether the surrounding region is a spinal cord region by using a classifier having been generated according to a machine learning method. The spinal cord centerline generation means 24b generates a spinal cord centerline comprising center points in the spinal cord regions detected by the spinal cord region detection means 24a, in a longitudinal cross section of vertebral bones. At the time the classifier of the spinal cord region detection means 24a calculates a judgment value representing a degree by which the judgment is carried out as to whether the surrounding region is a spinal cord region, the spinal cord centerline generation means 24b regards, as the center point, the target pixel which has been used as the reference point in the surrounding region whose judgment value is equal to or larger than a predetermined value. The vertebral bone centerline determination means 24c finds a centerline of the vertebral bones, based on positional relationships between the spinal cord centerline generated by the spinal cord centerline generation means 24b and the vertebral bones.

The vertebral bone centerline determination means 24c comprises longitudinal cross section generation means 24d and vertebral bone region detection means 24e. In the respective medical images, the longitudinal cross section generation means 24d extracts a luminance value of each pixel on a straight line not passing through the heart but passing through a spine region and the center point in each of the spinal cord regions detected by the spinal cord region detection means 24a, and generates the longitudinal cross section as exemplified in FIG. 19 by using the lines having the extracted luminance values. The vertebral bone region detection means 24e detects two lines of bone trabeculae having a predetermined luminance value or larger in the longitudinal cross section generated by the longitudinal cross section generation means 24d, and detects as the vertebral bones a region including a spine region sandwiched between the two detected lines.

The processing carried out by the vertebral bone detection unit 24 will be described next.

Figure 15:
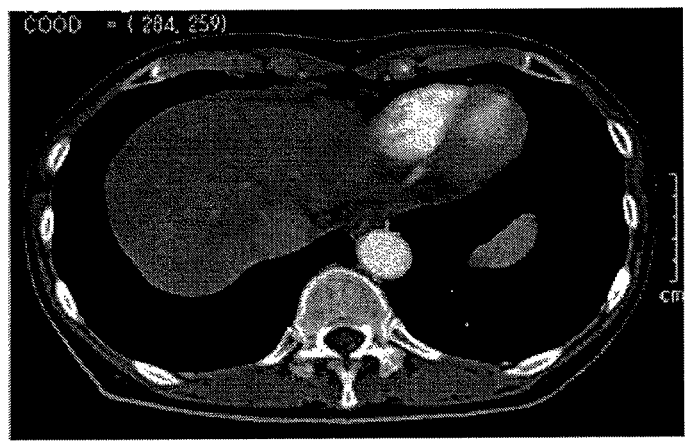
FIG. 15 shows an example of an axial image.

FIG. 14 is a flow chart showing the flow of the processing carried out by the vertebral bone detection unit 24. The spinal cord region detection means 24a detects the spinal cord regions (#11). FIG. 15 shows a CT image of a typical spinal cord in a medical image (an axial image) comprising cross sections at a plurality of positions from the chest to the groins of a subject, for example. Since spinal cord regions have clear patterns, the spinal cord regions can be stably detected in medical images, by using image detection techniques.

Figure 16:
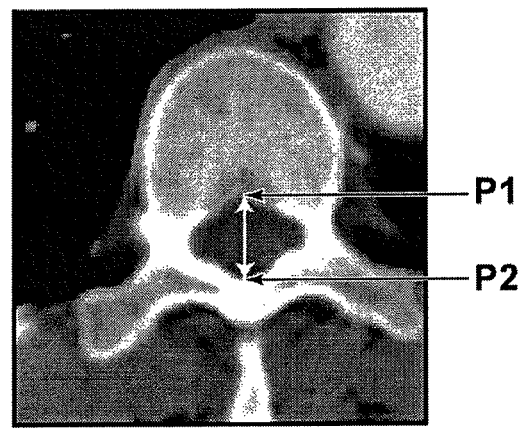
FIG. 16 shows an example of a portion of axial image around a vertebral bone.

As a method of detecting the spinal cord regions, a machine learning method based on Adaboost, which is a method of generating an integrated learning machine, can be used. More specifically, in order to trace the spinal cord regions, a machine learning method based on Adaboost is used wherein weights of a known method for feature point detection and the like and weights of learning data are sequentially updated at the time of re-sampling and the integrated learning machine is generated by adding weights to a learning machine. In each sample image for learning, two points such as points P1 and P2 at the top and bottom of a spinal cord region are specified as shown in FIG. 16, for example. The region of interest is set as a quadrilateral region centering the midpoint between the two points and having a length that is the double of the distance between the two specified points. Sizes of the quadrilateral regions cut from CT images of various patients at various positions (such as at thoracic vertebrae and lumber vertebrae) are normalized to the same size. The regions of interest generated in this manner are regarded as positive learning samples.

The spinal cord region detection means 24a then randomly cuts quadrilateral regions in various sizes from regions away from the specified regions, and causes the regions to have the same size. The regions generated in this manner are regarded as negative learning samples.

Figure 17:
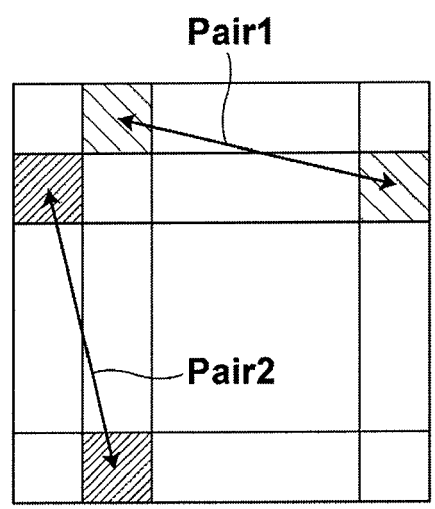
FIG. 17 schematically shows an example of feature values used in Adaboost processing.

The spinal cord region detection means 24a then generates the classifier that judges positive and negative patterns by using, as feature values, combinations of values of n pixel pairs selected randomly from images of the positive and negative learning samples as shown in FIG. 17, according to a machine learning method based on Adaboost.

At the time of detection of the spinal cord regions, the medical images are scanned, and the quadrilateral regions of various sizes centering the target pixels are cut therefrom. The feature values are then calculated as shown in FIG. 17.

The feature values are inputted to the classifier obtained through the learning, and the judgment value is found. A maximum judgment value is regarded as a score of the target pixel. A position (a pixel) at which the judgment value becomes largest is then found from each of the medical images, and regarded as the center of the spinal cord region therein.

As a method of detecting the spinal cord region, a known template matching method (such as a method described in Japanese Unexamined Patent Publication No. 2002-109548, for example) and a demarcation method using a ring model (such as a method described in U.S. Patent Application Publication No. 20070121778, for example) can be used in detection of the spinal cord region in the image processing workstation of the present invention.

The spinal cord centerline generation means 24b then generates the centerline from the center points of the spinal cord regions (#12). Predetermined pixels located substantially at the center of the respective spinal cord regions are used as the center points. The center points are not necessarily located exactly at the center of the respective spinal cord regions. The center points may be points located substantially at the same distance from the perimeter or predetermined two ends in the respective spinal cord regions, or points representing the center of mass therein.

More specifically, a smooth three-dimensional spinal cord centerline is found from the center points of the respective spinal cord regions in the medical images obtained at the previous step. As a method of calculating the spinal cord centerline, a method of fitting a polygonal line or a curve (such as a polynomial curve or a B-spline curve) to the center points of the spinal cord regions may be used (see Japanese Unexamined Patent Publication No. 6(1994)-189934, for example). Alternatively, a RANSAC method wherein samples are randomly extracted and a least square method is applied thereto may be used (see M. A. Fischler and R. C. Bolles, June 1981, "Random Sample Consensus: A Paradigm for Model Fitting with Applications to Image Analysis and Automated Cartography", Comm. of the ACM 24: pp. 381-395, for example).

The spinal cord centerline generation means 24b may use the judgment value (the value representing the degree to be judged as the spinal cord region, that is, a value corresponding to a likelihood of a pattern of spinal cord region) obtained at the time of setting the center point in each of the detected spinal cord regions. In this case, only the center points of the spinal cord regions whose judgment values exceed a threshold value are selected, and the smooth three-dimensional curve of the spinal cord regions is generated according to the method of calculating the spinal cord centerline described above.

At the time of using the method of calculating the spinal cord centerline described above, the judgment value may be used as a weight coefficient for the center point of each of the spinal cord regions.

Figure 18:
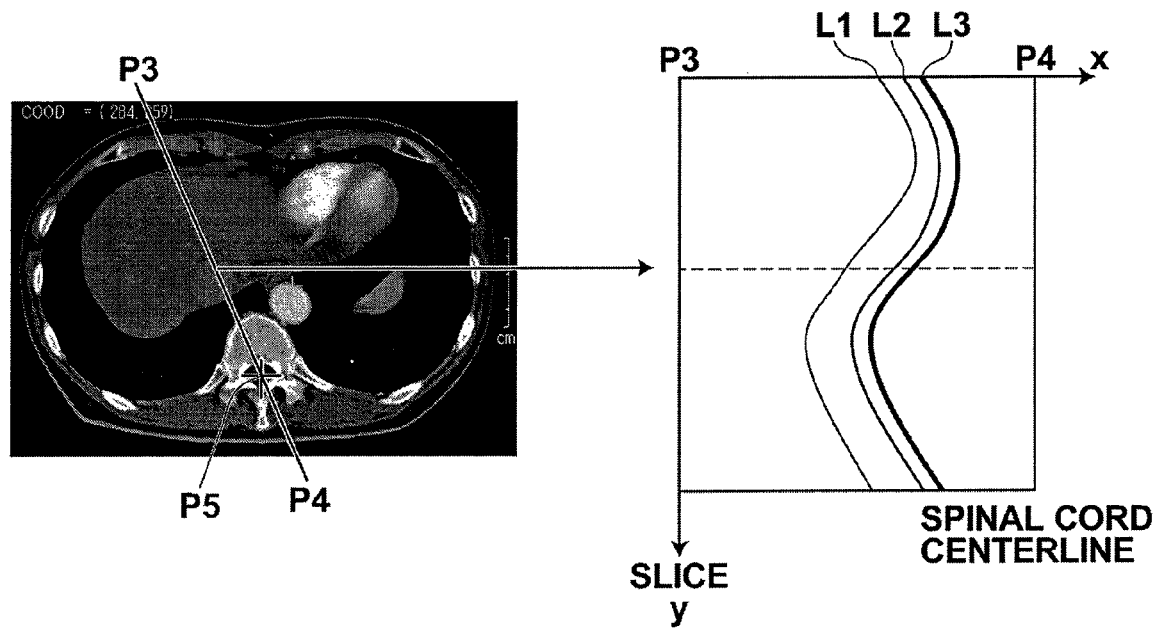
FIG. 18 shows an example of an axial image and a longitudinal cross section along a centerline of spinal cord.

The longitudinal cross section generation means 24d then generates the longitudinal cross section (#13). More specifically, the luminance value of each pixel on a straight line inclined counterclockwise by a degrees from a Y axis as a vertical line with respect to the center point in each of the spinal cord regions is extracted in each of the medical images as shown in FIG. 18, in order to calculate the centerline of the spine based on the spinal cord centerline calculated by the method described above. The longitudinal cross section is generated by the lines having the extracted luminance value. The straight lines generate the longitudinal cross section. Since the heart does not show a stable pattern due to many blood vessels or like around the heart, the straight line may be set so as to pass the center point and the spinal cord region but not to pass the heart.

The vertebral bone region detection means 24e detects boundary lines in the longitudinal cross section (#14). More specifically, in the longitudinal cross section, the spinal cord centerline becomes one line, and the spine region appears on the left of the spinal cord centerline as a region that has two lines of bone trabeculae having high CT values (that is, high pixel values) and a spongy bone region sandwiched by the two lines and having low CT values (that is, low pixel values).

The vertebral bone region detection means 24e calculates a centerline and a width of the vertebral bones (#15). More specifically, the vertebral bone region detection means 24e calculates the centerline of the vertebral bones by using the spinal cord centerline as a line L3 in FIG. 18. The vertebral bone region detection means 24e finds a difference in an x direction in the longitudinal cross section in FIG. 18. A large positive difference is found at an edge of the spinal cord region on the side of abdomen while a large negative difference is found at an edge thereof on the side of the back.

The vertebral bone region detection means 24e carries out a linear transformation on the spinal cord centerline L3, and calculates linear transform coefficients a and b by using Equation (1) below, in order to fit the centerline L3 to an edge line L2 of the spine region on the side of the back. In this manner, the vertebral bone region detection means 24e calculates an edge curve L5 of the spine region on the side of the back.

$$\sum_{i=1}^{N} g_x(ay_i + x_i + b, y_i) \tag{1}$$

For an edge line L1 on the side of the abdomen, the vertebral bone region detection means 24e calculates an edge curve L4 in the same manner.

A method of fitting is not necessarily limited to the fitting method described above, and the curves L4 and L5 may be calculated directly from gradients of the luminance values in the longitudinal cross section.

Figure 19:
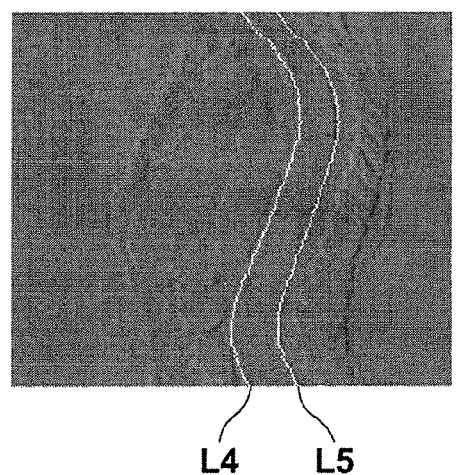
FIG. 19 shows boundary lines between vertebral bones.

As shown in FIG. 19, the calculated curves L4 and L5 are the boundary lines on the right and left of the vertebral bones including the spine region. The centerline and the width of the vertebral bones can then be calculated from the boundary lines on the right and left.

As has been described above, the centerline of the vertebral bones can be calculated accurately based on the positional relationships with the spinal cord centerline in the medical images, and points representing the centerline of the vertebral bones in each of the medical images can be outputted as center points of the vertebral bones therein.

In the above embodiment, the spinal cord centerline determination means 24c finds the centerline of the vertebral bones based on the positional relationships between the vertebral bones and the spinal cord centerline generated by the spinal cord centerline generation means 24b. Hereinafter, calculation of the centerline of vertebral bones by using a voxel image comprising stacked medical images will be described.

In the case where the center points in the spinal cord regions detected by the spinal cord region detection means 24a and a centerline in the voxel image are defined by Equation (2) below, the longitudinal cross section generation means 24d can express, by Equation (3) below, a new longitudinal cross section that cuts the voxel image by a cross section connecting points P3 and P4 in FIG. 18.

$$(X_k^c, Y_k^c, Z_k^c), k=1, \Lambda, N. \text{ where } N \text{ is the number of slice images} \tag{2}$$

$$P_k^s(\lambda) = \begin{pmatrix} X_k^s(\lambda) \\ Y_k^s(\lambda) \\ Z_k^s(\lambda) \end{pmatrix} = \begin{pmatrix} X_k^c \\ Y_k^c \\ Z_k^c \end{pmatrix} + \lambda \begin{pmatrix} \cos(\theta) \\ \sin(\theta) \\ 0 \end{pmatrix} \tag{3}$$

The symbol θ used in Equation (3) represents an angle of inclination of the cross section connecting the points P3 and P4 in FIG. 18, and the symbol λ represents a position of the cross section. A range of the position (that is, a range of λ) is determined by a range of frame of the medical images.

The vertebral bone region detection means 24e detects two lines of bone trabeculae having a predetermined luminance value or larger in the new longitudinal cross section generated by the longitudinal cross section generation means 24d, and detects a region sandwiched by the two lines and including the spine regions as the vertebral bones.

The vertebral bone region detection means 24e can find an edge in the new longitudinal cross section according to Equation (4) below, in order to find the two lines of bone trabeculae.

$$g'(P_k^s(\lambda)) = \frac{dg(P_k^s(\lambda))}{d\lambda} \approx \frac{g(P_k^s(\lambda + \Delta)) - g(P_k^s(\lambda))}{\Delta} \quad (4)$$

In Equation (4), Δ takes a small value and generally represents one pixel, which is not necessarily limited thereto.

The vertebral bone region detection means 24e enables fitting of the edge obtained according to Equation (4) to a wall of the vertebral bones on the side of the back, by using Equation (6) below, and can find the curve L5 as the edge line of the vertebral bones on the side of the back from Equation (7) below, by letting an optimal parameter obtained from minimization to be represented by Equation (5).

$$(\tilde{a}, \tilde{b}) \quad (5)$$

$$\sum_{k=1}^{N} g'(P_k^s(aZ_k^c + b)) \to \min \quad (6)$$

$$\tilde{P}_k^s(\lambda) = \begin{pmatrix} X_k^c \\ Y_k^c \\ Z_k^c \end{pmatrix} + (\tilde{a}Z_k^c + \tilde{b}) \begin{pmatrix} \cos(\theta) \\ \sin(\theta) \\ 0 \end{pmatrix} \quad (7)$$

The vertebral bone region detection means 24e can also find the edge curve L4 on the side of the abdomen in the same manner described above.

As shown in FIG. 19, the calculated curves L4 and L5 become the right and left boundary lines of the vertebral bones including the spine region. Based on the boundary lines on the right and left, the centerline and the width of the vertebral bones can be calculated.

As has been described above, the center of vertebral bones can be calculated accurately based on the positional relationships with the spinal cord centerline in the medical images, by using the voxel images.

Although the embodiment of the present invention has been described above, various modifications to the system configuration, the processing flow, the module configuration, the user interface and the like in this embodiment within the scope of the present invention are also included in the technical scope of the present invention. The embodiment described above is merely an example, and the above description should not be construed as limiting the technical scope of the present invention.

Figure 3:
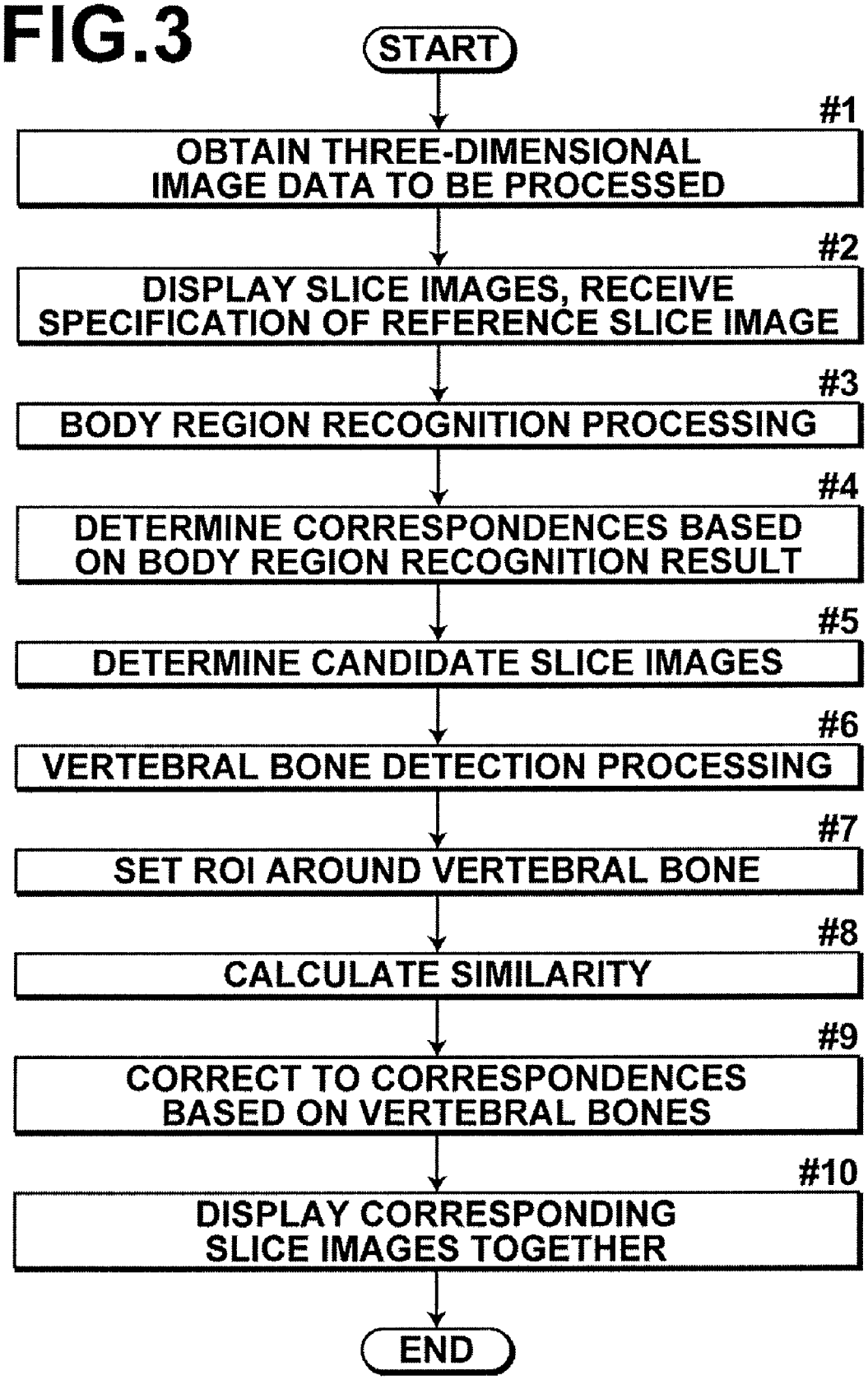
FIG. 3 is a flow chart showing the flow of image analysis and display processing as the embodiment of the present invention.

For example, in the above embodiment, the slice images in the two three-dimensional images are firstly displayed together (at Step #2 in FIG. 3). However, only the slice images in one of the three-dimensional images may be displayed first. In this case, when a user finds a desired one of the slice images by changing the slice images to be displayed, and selects "Display of Corresponding Past Slice Image of the Same Patient" from a menu on the screen, for example, the GUI control unit 27 may hand over the request to the control unit 21, and the control unit 21 causes the image data acquisition unit 22 to obtain the image data set of the past image of the patient related to the three-dimensional image being displayed. The control unit 21 regards the slice image being displayed at this time as the reference slice image, and determines the corresponding slice image in the past image as the other three-dimensional image, in the same manner as the embodiment described above (Steps #3 to #9 in FIG. 3). The corresponding slice images are displayed together in this manner.

In the above embodiment, after the data sets of the two three-dimensional images are obtained at Step #1 in FIG. 3, each of the slice images in one of the three-dimensional images may be regarded sequentially as the reference slice image, to repeat the processing from Step #3 to Step #9 without the processing at Step #2. Accordingly, the corresponding one of the slice images in the other three-dimensional image to each of the slice images in the former three-dimensional image is identified. At Step #10, the first slice image in one of the three-dimensional images is displayed together with the corresponding slice image in the other three-dimensional image. In this case, each of the slice images in one of the three-dimensional images may not necessarily be regarded sequentially as the reference slice image. Only a predetermined portion of the slice images may be regarded sequentially as the reference slice image to identify the corresponding slice images in the other three-dimensional image so that the correspondences between the other slice images in the two three-dimensional images can be determined sequentially based on the amount of shift of the slice image corresponding to the reference slice image before and after the correction, in the same manner as in the above embodiment (Step #10).

In the above embodiment, the body region recognition processing is carried out at the time of determination of the corresponding slice image (Step #3 in FIG. 3). However, the body region recognition processing may be carried out in advance so that the result of the recognition (the recognized body regions) is stored in the image database 4 by being related to the respective slice images as the accompanying information. In this case, at the time of determination of the corresponding slice image, the body region recognition result is obtained from the accompanying information of each of the slice images at Step #4, without the body region recognition processing.

In the above embodiment, the body region recognition unit 23, the vertebral bone detection unit 24, and the vertebral bone ROI setting unit 25 carry out the processing sequentially on each of the image data sets inputted thereto. However, the body region recognition unit 23, the vertebral bone detection unit 24, and the vertebral bone ROI setting unit 25 may be configured to carry out the processing in parallel on a plurality of image data sets inputted thereto. In this case, the control unit 21 sends all the input image data sets to the body region recognition unit 23, the vertebral bone detection unit 24, and the vertebral bone ROI setting unit 25.

The contents of the documents which were referenced within this specification are incorporated herein.

What is claimed is:
1. An image analysis apparatus comprising:
   correspondence determination means for determining a positional correspondence in a predetermined direction between two three-dimensional images representing a subject including a structure having periodicity in the predetermined direction, based on a criterion in which the structure having the periodicity contributes less; and correspondence correction means for correcting the correspondence determined by the correspondence determination means, based on a criterion in which the periodic structure contributes more, wherein the correspondence correction means corrects the correspondence by correcting a position in one of the three-dimensional images related by the determined correspondence in the predetermined direction to a position in the other three-dimensional image in the predetermined direction, within a range near the position in the former three-dimensional image in the predetermined direction.

2. The image analysis apparatus according to claim 1, wherein the range near the position is a range smaller than one periodic length of the periodic structure.

3. The image analysis apparatus according to claim 1, wherein the correspondence correction means detects the periodic structure in a tomographic image cut by a cross-sectional plane that is perpendicular to the predetermined direction at a given point in one of the three-dimensional images;

sets a region of interest including the detected periodic structure in the tomographic image;

detects the periodic structure in each of tomographic images cut by cross-sectional planes that are perpendicular to the predetermined direction at a plurality of candidate points within the range from a point in the other three-dimensional image, the point corresponding to the given point and having been related by the correspondence determined by the correspondence determination means;

respectively sets candidate regions corresponding to the region of interest and including the detected periodic structure in the tomographic images at the plurality of candidate points;

identifies a position of the cross-sectional plane of the tomographic image including the candidate region whose similarity with the region of interest is highest out of the candidate regions at the candidate points, in the predetermined direction; and corrects the correspondence so as to relate the identified position to the given point in the former three-dimensional image.

4. The image analysis apparatus according to claim 1, wherein the subject further includes a structure whose positional relationship to the periodic structure is changeable in the predetermined direction.

5. The image analysis apparatus according to claim 1, wherein the periodic structure is a spinal column having each vertebral bone as one period.

6. The image analysis apparatus according to claim 5, wherein the predetermined direction is a body axis direction of the subject and the correspondence determination means recognizes body regions in the subject represented by tomographic images cut by cross-sectional planes at a plurality of positions in the predetermined direction in each of the three-dimensional images by using at least one feature value representing a characteristic of a region including a portion other than the periodic structure in the tomographic images, and determines the correspondence so as to cause a matching degree between the body regions recognized in the two three-dimensional images at the plurality of positions to become high enough to satisfy a predetermined criterion.

7. An image analysis method comprising the steps of:

determining a positional correspondence in a predetermined direction between two three-dimensional images representing a subject including a structure having periodicity in the predetermined direction, based on a criterion in which the structure having the periodicity contributes less; and correcting the determined correspondence, based on a criterion in which the periodic structure contributes more, wherein the step of correcting the determined correspondence is the step of correcting the determined correspondence by correcting a position in one of the three-dimensional images related by the determined correspondence in the predetermined direction to a position in the other three-dimensional image in the predetermined direction, within a range near the position in the former three-dimensional image in the predetermined direction.

8. A non-transitory recording medium readable by a computer and storing an image analysis program that causes the computer to execute the steps of:

determining a positional correspondence in a predetermined direction between two three-dimensional images representing a subject including a structure having periodicity in the predetermined direction, based on a criterion in which the structure having the periodicity contributes less; and correcting the determined correspondence, based on a criterion in which the periodic structure contributes more, wherein the step of correcting the determined correspondence is the step of correcting the determined correspondence by correcting a position in one of the three-dimensional images related by the determined correspondence in the predetermined direction to a position in the other three-dimensional image in the predetermined direction, within a range near the position in the former three-dimensional image in the predetermined direction.

* * * * *